United States Patent
Kakeya et al.

(10) Patent No.: US 9,869,007 B2
(45) Date of Patent: Jan. 16, 2018

(54) HYDROGEN STORAGE ALLOY, HYDROGEN STORAGE ALLOY ELECTRODE, SECONDARY BATTERY, AND METHOD FOR PRODUCING HYDROGEN STORAGE ALLOY

(71) Applicants: GS Yuasa International Ltd., Minami-ku, Kyoto-shi, Kyoto (JP); National Institute of Advanced Industrial Science and Technology, Chiyoda-ku, Tokyo (JP)

(72) Inventors: Tadashi Kakeya, Kyoto (JP); Manabu Kanemoto, Kyoto (JP); Minoru Kuzuhara, Kyoto (JP); Tetsuya Ozaki, Kyoto (JP); Masaharu Watada, Kyoto (JP); Tetsuo Sakai, Osaka (JP)

(73) Assignees: GS YUASA INTERNATIONAL LTD., Kyoto (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/219,753

(22) Filed: Jul. 26, 2016

(65) Prior Publication Data
US 2016/0333443 A1    Nov. 17, 2016

Related U.S. Application Data

(60) Division of application No. 14/590,613, filed on Jan. 6, 2015, now Pat. No. 9,496,550, which is a division
(Continued)

(30) Foreign Application Priority Data

Aug. 9, 2006 (JP) ................ 2006-217488

(51) Int. Cl.
H01M 4/52 (2010.01)
H01M 4/32 (2006.01)
(Continued)

(52) U.S. Cl.
CPC .............. $C22C$ *19/03* (2013.01); $C22C$ *1/023* (2013.01); $C22C$ *1/0441* (2013.01); $C22C$ *19/007* (2013.01); $C22F$ *1/002* (2013.01); $C22F$ *1/10* (2013.01); $H01M$ *4/134* (2013.01); $H01M$ *4/1395* (2013.01); $H01M$ *4/366* (2013.01); $H01M$ *4/383* (2013.01);
(Continued)

(58) Field of Classification Search
None
See application file for complete search history.

(56) References Cited

U.S. PATENT DOCUMENTS 5,840,166 A  * 11/1998 Kaneko ................ H01M 4/383
                                                      148/538
2003/0096164 A1 * 5/2003 Sakai ................... C01B 3/0052
                                                      429/206

* cited by examiner

Primary Examiner — Yoshitoshi Takeuchi
(74) Attorney, Agent, or Firm — Sterne, Kessler, Goldstein & Fox PLLC

(57) ABSTRACT

Provided is a hydrogen storage alloy which is characterized in that two or more crystal phases having different crystal structures are layered in a c-axis direction of the crystal structures. The hydrogen storage alloy is further characterized in that a difference between a maximum value and a minimum value of a lattice constant a in the crystal structures of the laminated two or more crystal phases is 0.03 Å or less.

4 Claims, 7 Drawing Sheets

Related U.S. Application Data of application No. 13/587,125, filed on Aug. 16, 2012, now abandoned, which is a continuation of application No. 12/376,922, filed as application No. PCT/JP2007/065507 on Aug. 8, 2007, now Pat. No. 8,343,660.

(51) Int. Cl.
| | |
|---|---|
| *H01M 10/30* | (2006.01) |
| *H01M 6/10* | (2006.01) |
| *C22F 1/10* | (2006.01) |
| *C22C 19/03* | (2006.01) |
| *C22C 1/04* | (2006.01) |
| *C22C 19/00* | (2006.01) |
| *H01M 4/38* | (2006.01) |
| *H01M 4/36* | (2006.01) |
| *C22C 1/02* | (2006.01) |
| *C22F 1/00* | (2006.01) |
| *H01M 4/134* | (2010.01) |
| *H01M 4/1395* | (2010.01) |
| *H01M 10/34* | (2006.01) |
| *H01M 4/02* | (2006.01) |

(52) U.S. Cl.
CPC .... *H01M 10/345* (2013.01); *H01M 2004/027* (2013.01); *Y10T 428/12493* (2015.01)

HYDROGEN STORAGE ALLOY, HYDROGEN STORAGE ALLOY ELECTRODE, SECONDARY BATTERY, AND METHOD FOR PRODUCING HYDROGEN STORAGE ALLOY

TECHNICAL FIELD

The invention relates to a hydrogen storage alloy, a hydrogen storage alloy electrode, a secondary battery, and a method for producing a hydrogen storage alloy.

BACKGROUND ART

A hydrogen storage alloy is an alloy capable of safely and easily storing hydrogen as an energy source and has drawn an attention as a new energy conversion and storage material and its application fields are in a wide range, e.g., hydrogen storage and transportation, beat storage and transportation, heat-mechanical energy conversion, separation and purification of hydrogen, isolation of hydrogen isotopes, batteries using hydrogen as active materials, catalysts for synthetic chemical, temperature sensors, and so forth.

For example, a nickel-metal hydride battery using a hydrogen storage alloy as a negative electrode material has characteristics such as (a) high capacity; (b) durability to overcharge and over discharge; (c) capability of charging and discharging at high efficiency; (d) cleanness and has been actively investigated to have further improved capabilities (improvement of retention ratio of capacity in the case of repeating charge and discharge, that is, cycle life, improved capacity of the battery, etc.).

So far, an $AB_5$ type rare earth-Ni-based alloy having a $CaCu_5$ type crystal structure has been put into practical use as an electrode material for a nickel-metal hydride battery, one application example of such a hydrogen storage alloy; however the discharge capacity reaches almost a limit of about 300 mAh/g and presently it becomes difficult to further improve the capacity.

Further, as a new hydrogen storage alloy, a rare earth metal-Mg—Ni based alloy, for example, $LaCaMgNi_3$ alloys (Patent Document 1) having a $PuNi_3$ type crystal structure have drawn attention and it is reported that a discharge capacity exceeding that of an $AB_5$ type alloy can be obtained by using these alloy for electrode materials.

It is also reported that in addition of the crystal phase having the $AB_5$ type crystal structure, electrode materials of hydrogen storage alloys containing a crystal phase of $AB_2$ type crystal structure such as $MgCu_2$ type or rare earth metal-Mg—Ni type alloys containing, as a main phase, the crystal phase having $Ce_2Ni_7$ type, $CeNi_3$ type, or $Gd_2Co_7$ type crystal structure have high hydrogen storage capacities and show good hydrogen release characteristics (Patent Document 2).

Furthermore, with respect to alloys having $Ce_5CO_{19}$ type crystal structure, it is reported that electrodes complexed with rare earth-Ni alloy having a $CaCu_5$ type crystal structure are excellent in hydrogenation reaction speed (Patent Document 3).

Patent Document 1: Japanese Patent No. 3015885
Patent Document 2: Japanese Patent Application Laid-Open (JP-A) No. 11-328469
Patent Document 8: Japanese Patent No. 3490871

DISCLOSURE OF THE INVENTION

Problems to be Solved by the Invention

However, in the above-mentioned conventional hydrogen storage alloys, a problem that the hydrogen storage capacity is decreased in the case where hydrogen storage and release are repeated has not sufficiently been solved yet.

Further, with respect to the conventional hydrogen storage alloys, there is another problem that when the hydrogen storage alloys are made to be excellent in the cycle life to quickly release the stored hydrogen, the stored hydrogen is gradually released simply by leaving the hydrogen storage alloys as they are.

In view of the above state of the art, one aim of the invention is to provide a hydrogen storage alloy of which the hydrogen storage capacity is hardly decreased even if hydrogen storage and release are repeated, that is, a hydrogen storage alloy excellent in the cycle life.

Another aim of the invention is to provide a hydrogen storage alloy excellent in the cycle life and having high hydrogen storage amount.

Further, another aim of the invention is to provide a hydrogen storage alloy having little self-release of hydrogen while maintaining the excellent cycle life.

Means for Solving the Problems

To solve the above-mentioned problems, the inventors of the invention have made various investigations and accordingly have found that a hydrogen storage alloy having a layered structure of a plurality of crystal phases with different crystal structures such as a crystal phase of $Pr_5Co_{19}$ type crystal structure, a crystal phase of $Ce_2Ni_7$ type crystal structure, and the like can exhibit remarkably excellent cycle life and the finding now leads to completion of the invention.

That is, the invention provides the following hydrogen storage alloy, a hydrogen storage alloy electrode containing the hydrogen storage alloy, a secondary battery comprising the electrode, and a method of producing the hydrogen storage alloy.

(1) A hydrogen storage ahoy containing two or more crystal phases having different crystal structures which are layered in the c-axis direction of the crystal structures.

(2) The hydrogen storage alloy according to the above description (1) in which the difference of the maximum value and the minimum value of the lattice constant a in the crystal structures of the layered two or more crystal phases is 0.03 Å or less.

(3) The hydrogen storage alloy according to the above description (1) or (2) in which the crystal phases include two or more types selected from a group consisting of a crystal phase having $La_5MgNi_{24}$ type crystal structure, a crystal phase having $Ce_5Co_{19}$ type crystal structure, and a crystal phase having $Ce_5Ni_7$ type crystal structure.

(4) The hydrogen storage alloy according to one of the above descriptions (1) to (3) having a composition defined by a general formula $R1_aR2_bR3_c$ (wherein R1 is one or more kind elements selected from a group consisting of rare earth metals including Y; R2 is one or more kind elements selected from a group consisting of Mg, Ca, Sr, and Ba; R3 is one or more kind elements selected from a group consisting of Ni, Co, Mn, Al, Cr, Fe, Cu, Zn, Si, Sn, V, Nb, Ta, Ti, Zr, and Hf and a, b, and c satisfy $10 \le a \le 30$; $1 \le b \le 10$; $65 \le c \le 90$; and $a+b+c=100$).

(5) The hydrogen storage alloy according to the above description (1) having a composition defined by a general formula $R1_dR2_eR4_fR5_g$ (wherein R1 is one or more kind elements selected from a group consisting of rare earth metals including Y; R2 is one or more kind elements selected from a group consisting of Mg, Ca, Sr and Ba; R4 is one or more kind elements selected from a group consisting of Ni, Co, Cr, Fe, Cu, Zn, Si, Sn, V, Nb, Ta, Ti, Zr, and Hf; R5 is one or two elements selected from Mn and Al; and d, e, f, and g satisfy 8≤d≤19; 2≤e≤9; 78≤f≤79; 1≤g≤4; and d+e+f+g=100) and satisfying 3.53≤(B/A)≤3.80 and 0.0593(B/A)+1.59≤rA≤0.0068(B/A)+1.81 in the case (B/A) is defined as (f+g)/(d+e) and rA (Å) is defined as the average atom radius of the R1 and R2.

(6) The hydrogen storage alloy according to the above description (5) in which R1 consists of one or more kind elements R1' selected from a group consisting of Ce, Pr, Nd, Sm, and Y and La and the ratio of La/R1' is 5 or less; the R2 is Mg; the R4 is one or two elements selected from Ni and Co; the R5 is Al; and d, e, f, and g satisfy 16≤d≤19; 2≤e≤5; 73≤f≤78; and 2≤g≤4.

(7) The hydrogen storage alloy according to the above description (5) or (6) having a main generative phase is a crystal phase having $Pr_5Co_{19}$ type crystal structure or a crystal phase having $Ce_5Co_{19}$ type crystal structure.

(8) The hydrogen storage alloy according to the above description (1) having, as a main generative phase, a crystal phase having $Ce_5Co_{19}$ type crystal structure and a composition defined by a general formula $La_hR6_iR7_jMg_kR8_m$ (wherein R6 is one or more kind elements selected from a group consisting of rare earth metals including Y and excluding La; R7 is one or more kind elements selected from a group consisting of Zr, Ti, Zn, Sn and V; R8 is one or more kind elements selected from a group consisting of Ni, Co, Mn, Al, Cu, Fe, Cr, and Si; and h, i, j, k and m satisfy 0≤j≤0.65; 2≤k≤5.5; 0.70≤h/(h+i)≤0.85; and h+i+j+k+m=100).

(9) The hydrogen storage alloy according to the above description (1) in which the ratio of the crystal phase having $CaCu_5$ type crystal structure is 22% by weight or less.

(10) The hydrogen storage alloy according to the above description (9) in which the hydrogen equilibrium pressure is 0.07 MPa or less.

(11) The hydrogen storage alloy according to the above description (9) or (10) having a composition defined by a general formula $R1_nR2_pR4_qR5_r$ (wherein R1 is one or more kind elements selected from a group consisting of rare earth metals including Y; R2 is one or more kind elements selected from a group consisting of Mg, Ca, Sr, and Ba; R4 is one or more kind elements selected from a group consisting of Ni, Co, Cr, Fe, Cu, Zn, Si, Sn, V, Nb, Ta, Ti, Zr, and Hf; R5 is one or two kind elements selected from Mn and Al; and n, p, q, and r satisfy 16≤n≤23; 2≤p≤8; 68.55≤q≤76; 1≤r≤6.5; and n+p+q+r=100).

(12) The hydrogen storage alloy according to one of the above descriptions (9) to (11) wherein the content of Mn is 5% by weight or less.

(18) A hydrogen storage alloy electrode using the hydrogen storage alloy according to any one of the above descriptions (1) to (12) as a hydrogen storage medium.

(14) A secondary battery using the hydrogen storage alloy electrode according to the above description (18) as a negative electrode.

(15) A method for producing the hydrogen storage alloy according to one of the above descriptions (1) to (12), comprising a melting step of heat melting alloy raw materials at prescribed mixing ratio in inert gas atmosphere; a cooling step of rapid solidification the melted alloy at a cooling speed of 1000° C./s or higher; and an annealing step of further annealing the alloy subjected to the cooling step at 860° C. or higher and 1000° C. or lower in inert gas atmosphere in pressurized state.

Herein, crystal phase in the invention means a region where a single crystal structure exists.

Effect of the Invention

With respect to conventional hydrogen storage alloys, some contain two or more crystal phases having crystal structures different from one another. However, unlike the invention, these crystal phases are not layered in the c-axis direction and exist independently in individual regions. Therefore, it is supposed that significant lattice strains are caused in the respective crystal phases at the time of absorption and release of hydrogen are repeated and as a result, deterioration of the alloys such as pulverization is caused when absorption and release of hydrogen are repeated, resulting in aggravation of the cycle life.

On the other hand, with respect to the hydrogen storage alloy of the invention, two or more crystal phases having crystal structures different from one another are layered in the c-axis direction of the crystal structures. Therefore, the strains of the crystal phases caused because of repeated absorption and release of hydrogen are remarkably moderated. Such moderation of the strains suppresses deterioration at the time of repeating absorption and release of hydrogen and as a result, the cycle life can remarkably be improved.

Accordingly, the hydrogen storage alloy of the invention is provided with an effect to cause an excellent cycle life. Further, since the hydrogen storage alloy electrode and the secondary battery of the invention are configured by using such a hydrogen storage alloy, even if discharge and charge are repeated, they are provided with an excellent property that the discharge capacity is hardly decreased. Furthermore, the method for producing the hydrogen storage alloy of the invention is provided with an effect to efficiently produce such a hydrogen storage alloy.

Figure 1:
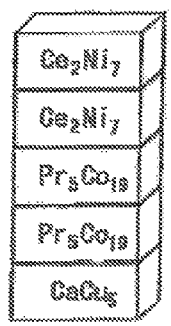
FIG. 1: A schematic drawing showing one embodiment of a first hydrogen storage alloy.

BEST MODES OF THE EMBODIMENTS (First Hydrogen Storage Alloy)

The first hydrogen storage alloy of the invention contains two or more crystal phases having crystal structures different from one another and layered in the c-axis direction of the crystal structures.

Examples of the above-mentioned crystal phases are a crystal phase having a rhombohedral $La_5MgNi_{24}$ type crystal structure (hereinafter, sometimes referred to simply $La_5MgNi_{24}$ phase), a crystal phase having a hexagonal $Pr_5Co_{19}$ type crystal structure (hereinafter, sometimes referred to simply $Pr_5Co_{19}$ phase), a crystal phase having a rhombohedral $Ce_5Co_{19}$ type crystal structure (hereinafter, sometimes referred to simply $Ce_5Co_{19}$ phase), a crystal phase having a hexagonal $Ce_2Ni_7$ type crystal structure (hereinafter, sometimes referred to simply $Ce_2Ni_7$ phase), a crystal phase having a rhombohedral $Gd_2Co_7$ type crystal structure (hereinafter, sometimes referred to simply $Gd_2Co_7$ phase), a crystal phase having a hexagonal $CaCu_5$ type crystal structure (hereinafter, sometimes referred to simply $CaCu_5$ phase), a crystal phase having a cubic $AuBe_5$ type crystal structure (hereinafter, sometimes referred to simply $AuBe_5$ type phase), and a crystal phase having a rhombohedral $PuNi_3$ type crystal structure (hereinafter, sometimes referred to simply $PuNi_3$ phase).

Particularly, it is preferable to layer two or more kind crystal phases selected from a group consisting of $La_5MgNi_{24}$ phase, $Pr_4Co_{19}$ phase, $Ce_5Co_{19}$ phase, and $Ce_2Ni_7$ phase. A hydrogen storage alloy having layered structure of these crystal phases cause less strains since the difference of the expansion and shrinkage ratio among the respective crystal phases and thus has an excellent property that less deterioration is caused at the time of repeating hydrogen absorption and release.

Herein, the $La_5MgNi_{24}$ type crystal structure means a crystal structure formed by inserting 4 $AB_5$ units between $A_2B_4$ units: the $Pr_5Co_{19}$ type crystal structure means a crystal structure formed by inserting 8 $AB_5$ units between $A_2B_4$ units: the $Ce_5Co_{19}$ type crystal structure means a crystal structure formed by inserting 3 $AB_5$ units between $A_2B_4$ units: the $Ce_5Ni_7$ type crystal structure means a crystal structure formed by inserting 2 $AB_5$ units between $A_2B_4$ units: the $Gd_2Co_7$ type crystal structure means a crystal structure formed by inserting 2 $AB_5$ units between $A_2B_4$ units: and the $AuBe_5$ type crystal structure means a crystal structure composed of $A_2B_4$ units alone.

In addition, the $A_2B_4$ unit means a crystal lattice having a hexagonal $MgZn_2$ type crystal structure (C14 structure) or a hexagonal $MgCu_2$ type crystal structure (C15 structure) and $AB_5$ unit means a crystal lattice having a hexagonal $CaCu_5$ type crystal structure.

Further, A denotes any element selected from a group consisting of rare earth metal elements and Mg and B denotes any element selected from a group consisting of transition metal elements and Al.

The layering order of the above-mentioned respective crystal phases is not particularly limited and any specified crystal phase combination may be layered repeatedly with periodicity or the respective crystal phases may be layered at random without periodicity.

In addition, with respect to the crystal phases having the above-mentioned respective crystal structures, the crystal structures can be specified by carrying out X-ray diffraction for milled alloy powders and analyzing the obtained X-ray diffraction patterns by Rietveld method.

A schematic drawing of one embodiment of the first hydrogen storage alloy is shown in FIG. 1. As shown in FIG. 1, one embodiment of the first hydrogen storage alloy is configured by layering the $CaCu_5$ phase, two $Pr_5Co_{19}$ phases neighboring to the $CaCu_5$ phase, and two $Ce_2Ni_7$ phase neighboring to the $Pr_5Co_{19}$ phases in the c-axis direction of the crystal structure.

Figure 2:
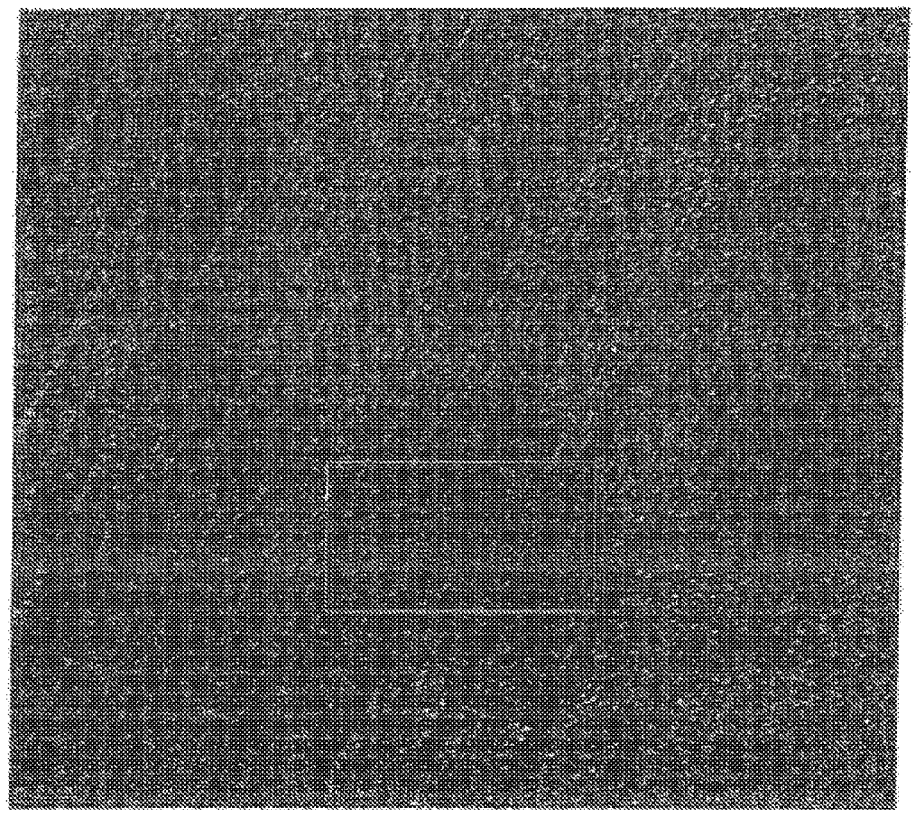
FIG. 2: A TEM image showing one example of the first hydrogen storage alloy.
Figure 3:
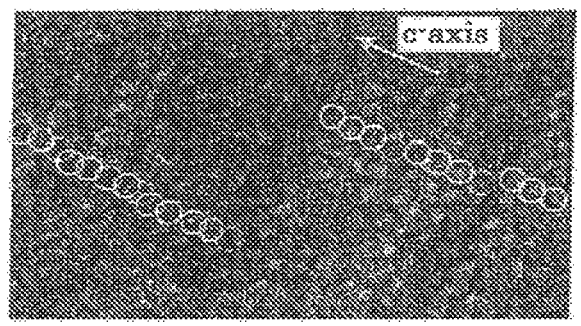
FIG. 3: A magnified drawing of a portion of FIG. 2.

Observation of the lattice image of the alloy by TEM makes it possible to confirm the fact that two or more crystal phases having different crystal structures are layered in the c-axis direction of the crystal structures One example of the lattice image of the first hydrogen storage alloy of the invention is shown in FIG. 2 and FIG. 3.

These drawings shows that this hydrogen storage alloy is configured by layering a crystal phase formed by repeating arrangement of 3 $AB_5$ units inserted between $A_2B_4$ units and a crystal phase formed by repeating arrangement of 4 $AB_5$ units inserted between $A_2B_4$ units in the c-axis direction. The former crystal phase is a crystal phase having the $Ce_5Co_{19}$ phase crystal structure and the latter is a crystal phase having the $LaMgNi_{24}$ type crystal structure. Observation of the lattice image by TEM in such a manner makes it possible to confirm the fact that two or more crystal phases having different crystal structures are layered in the c-axis direction, which is a constituent factor of the invention.

As described, since the first hydrogen storage alloy of the invention comprises two or more crystal phases having different crystal structures and layered in the c-axis direction, the strains of the crystal phases at the time of absorbing hydrogen can be moderated by neighboring other crystal phases. Accordingly, even if hydrogen absorption and release are repeated, less pulverization of the alloy is caused and thus an excellent cycle life can be caused.

(Second Hydrogen Storage Alloy)

The second hydrogen storage alloy of the invention is configured by adjusting the difference of the maximum value and the minimum value of the lattice constant a (hereinafter, also referred to as a-axis length) in the crystal structures of the layered two or more crystal phases to be 0.08 Å or less in the first hydrogen storage alloy.

When the difference of the maximum value and the minimum value of the a-axis length of the respective crystal phases is configured by adjusted to be 0.08 Å or less, the strains among the respective crystal phases caused at the time of hydrogen absorption and release are further reduced and the hydrogen storage alloy becomes difficult to be pulverized even if hydrogen absorption and release are repeated, that is, the hydrogen storage alloy becomes excellent in the cycle life.

The difference of the maximum value and the minimum value of the a-axis length of the respective crystal phases is preferably 0.02 Å or less, more preferably 0.016 Å or less, and even more preferably 0.01 Å or less.

When the difference of the maximum value and the minimum value of the a-axis length is in the above-mentioned range, the capacity retention ratio of the hydrogen storage alloy is further improved and the cycle life can be improved.

Herein, the a-axis length in the invention can be measured by carrying out crystal structure analysis of the hydrogen storage alloy by an X-ray diffraction apparatus. More practically, the a-axis length can be calculated for each crystal phase by determining the lattice constant of each crystal phase from XRD patterns by Rietveld method (analysis software: RIETAN2000).

The above-mentioned first or second hydrogen storage alloy is preferable to have a composition defined by a general formula $R1_aR2_bR3_c$ (wherein R1 is one or more kind elements selected from a group consisting of rare earth metals including Y; R2 is one or more kind elements selected from a group consisting of Mg, Ca, Sr, and Ba; R3 is one or more kind elements selected from a group consisting of Ni, Co, Mn, Al, Cr, Fe, Cu, Zn, Si, Sn, V, Nb, Ta, Ti, Zr, and Hf; and a, b, and c satisfy $10 \le a \le 30$; $1 \le b \le 10$; $65 \le c \le 90$; and $a+b+c=100$).

(Third Hydrogen Storage Alloy)

The third hydrogen storage alloy of the invention is the first hydrogen storage alloy further having a composition defined by a general formula $R1_dR2_eR4_fR5_g$ (wherein R1 is one or more kind elements selected from a group consisting of rare earth metals including Y; R2 is one or more kind elements selected from a group consisting of Mg. Ca, Sr, and Ba; R4 is one or more kind elements selected from a group consisting of Ni, Co, Cr, Fe, Cu, Zn, Si, Sn, V, Nb, Ta, Ti, Zr, and Hf; R5 is one or two elements selected from Mn and Al; and d, e, f and g satisfy $8 \le d \le 19$; $2 \le e \le 9$; $73 \le f \le 79$; $1 \le g \le 4$; and $d+e+f+g=100$) and satisfying $3.53 \le (B/A) \le 8.80$ and $0.0693(B/A)+1.59 \le rA \le 0.0063(B/A)+1.81$, preferably $0.0593(B/A)+1.59 \le rA \le 1.827$, in the case (B/A) is defined as $(f+g)/(d+e)$ and rA (Å) is defined as the average atomic radius of R1 and R2.

In the case the average atom radius rA (Å) of the R1 and R2 elements (that is, the element in the A side) composing the crystal structures of the hydrogen storage alloy and the ratio (B/A) of the R1 and R2 elements (that is, the elements in the A side) to the R4 and R5 elements (that is, the elements in the B side) satisfy the following relational expressions: $3.53 \le (B/A) \le 3.80$ and $0.0593(B/A)+1.59 \le rA \le 0.0063(B/A)+1.81$: the R2 element tends to be included in the $A_2B_4$ units and as a result, segregation of the R2 element is prevented and it becomes easy to form the layered body of the crystal phases having desired crystal structures and accordingly, a hydrogen storage alloy excellent in the cycle life can be obtained.

The third hydrogen storage alloy, preferably, wherein the R1 consists of one or more kind elements R1' selected from a group consisting of Ce, Pr, Nd, Sm, and Y and La at La/R1' ratio or 8 or less; the R2 is Mg; R4 is one or two elements selected from Ni and Co; R5 is Al.

In the case where La is substituted with one or more kind elements R1' selected from a group consisting of Ce, Pr, Nd, Sm, and Y whose atomic radius are smaller than the La at La/R1' ratio or 5 or less, and the R2 is Mg, the R4 is one or two elements selected from Ni and Co, the R5 is Al, and the d, e, f, and g respectively satisfy $16 \le d \le 19$, $2 \le e \le 5$, $73 \le f \le 78$, and $2 \le g \le 4$; Mg as the R2 element tends to be included further easier in the $A_2B_4$ units and accordingly, a hydrogen storage alloy excellent in the cycle life can be obtained.

Third hydrogen storage alloy preferably contains a crystal phase having $Pr_5Co_{19}$ type crystal structure or a crystal phase having $Ce_5Co_{19}$ type crystal structure and further preferably contains the crystal phase as the main produced phase.

When the crystal phase having $Pr_5Co_{19}$ type crystal structure or the crystal phase having $Ce_5Co_{19}$ type crystal structure is the main produced phase, the lattice expansion coefficient is small at the time of hydrogen absorption and resulted in an action that less strains are caused, thereby giving an effect to further improve the cycle life.

Herein, the main produced phase means the phase at the highest production ratio.

(Fourth Hydrogen Storage Alloy)

The fourth hydrogen storage alloy of the invention is configured to have, in the said first hydrogen storage alloy, a crystal phase having $Ce_5Co_{19}$ type crystal structure and a composition defined by a general formula $La_hR6_iR7_jMg_kR8_m$ (wherein R6 is one or more kind elements selected from a group consisting of rare earth metals including Y and excluding La; R7 is one or more kind elements selected from a group consisting of Zr, Ti, Zn, Sn and V; R8 is one or more kind elements selected from a group consisting of Ni, Co, Mn, Al, Cu, Fe, Cr, and Si; and h, i, j, k and m citify $0.70 \le h/(h+i) \le 0.85$; and $h+i+j+k+m=100$).

According to the fourth hydrogen storage alloy, since the crystal phase having $Ce_5Co_{19}$ type crystal structure is contained as an indispensable phase, the alloy becomes excellent in the cycle life and furthermore, since the ratio $h/(h+i)$ of La to the total of La and R6 element is in a range satisfying $0.70 \le h/(h+i) \le 0.85$, segregation of Mg can be prevented and the production ratio of the crystal phase having the $CaCu_5$ type crystal structure which is inferior in the cycle life can be decreased and on the other hand, the ratio of the crystal phase having the $Ce_5Co_{19}$ type crystal structure which is excellent in the cycle life is increased and as a result, a hydrogen storage alloy having high hydrogen storage capacity and excellent in the cycle life can be obtained.

In the fourth hydrogen storage alloy, j is preferable to be 0 or higher and 0.65 or lower and more preferable to be 0.2 or higher and 0.65 or lower. When j is in the above-mentioned numeral range, because of the existence of the R7 element (that is, one or more kind elements selected from a group consisting of Zr, Ti, Zn, Sn and V), Mg becomes difficult to segregate and the ratio of the crystal phase having the $Ce_5Co_{19}$ type crystal structure is increased and the hydrogen storage capacity is increased.

Further, in the fourth hydrogen storage alloy k is preferable to be 2 or higher and 5.5 or lower and more preferable to be 3 or higher and 5 or lower. When k is in the above-mentioned numeral range, segregation of Mg is prevented and the hydrogen storage alloy is provided with high hydrogen storage capacity and becomes excellent in the cycle life.

(Fifth Hydrogen Storage Alloy)

The fifth hydrogen storage alloy of the invention is the hydrogen storage alloy which contains 22% by weight or less of the crystal phase having the $CaCu_5$ type crystal structure according to the first hydrogen storage alloy.

Conventionally, it is known that the crystal phase having the $CaCu_5$ type crystal structure is excellent in the cycle life despite of a low discharge capacity. However, according to the results of the investigations which the inventors of the invention have made, it is found that in a hydrogen storage alloy configured by layering two or more layers of crystal phases having crystal structures different from one another, if the $CaCu_5$ phase exists much, the cycle life contrarily becomes difficult to be improved.

The fifth hydrogen storage alloy is made further excellent in the cycle life by adjusting the $CaCu_5$ phase ratio to be 22% by weight or less.

Further, in the fifth hydrogen storage alloy, the hydrogen equilibrium pressure is 0.07 MPa or lower.

Conventionally, a hydrogen storage alloy has a property that hydrogen absorption is difficult and release of absorbed hydrogen is easy in the case of high hydrogen equilibrium pressure. Accordingly, if the high rate capability is improved for the hydrogen storage alloy, self-release of hydrogen becomes easy.

However, as a result of the investigations by the inventors, it is found that a good high rate capability can be obtained in the case where the hydrogen equilibrium pressure is set to be as low as 0.07 MPa or lower in the hydrogen storage alloy comprising two or more layers of crystal phases having crystal structures different from one another and containing 22% by weight or less of the crystal phase having the $CaCu_5$ type crystal structure. This seems due to improvement in diffusivity of hydrogen in the alloy.

Accordingly, in the fifth hydrogen storage alloy, the high rate capability is made excellent and self-release of hydrogen (in the case of a battery, self discharge) becomes difficult by setting the hydrogen equilibrium pressure to be 0.07 MPa or lower.

Herein, the hydrogen equilibrium pressure means the equilibrium pressure at H/M=0.5 (equilibrium pressure in the case the ratio of hydrogen atoms to metal atoms is 0.5) in the PCT curve (pressure-composition isothermal line) at 80° C.

With respect to the fifth hydrogen storage alloy, the Mn content in the alloy is preferable to be 5% by weight or less. When the Mn content is adjusted to be 5% by weight or less, while the high rate capability is maintained, the self-release of hydrogen can further be suppressed.

Further, the fifth hydrogen storage alloy is preferable to have a composition defined by a general formula $R1_nR2_pR4_qR5_r$ (wherein R1 is one or more kind elements selected from a group consisting of rare earth metals including Y; R2 is one or more kind elements selected from a group consisting of Mg, Ca, Sr, and Ba; R4 is one or more kind elements selected from a group consisting of Ni, Co, Cr, Fe, Cu, Zn, Si, Sn, V, Nb, Ta, Ti, Zr, and Hf; R5 is one or two kind elements selected from Mn and Al; and n, p, q, and r satisfy $16 \leq n \leq 23$; $2 \leq p \leq 8$; $68.5 \leq q \leq 76$; $1 \leq r \leq 6.5$; and n+p+q+r=100).

In terms of saving material cost, the hydrogen storage alloy according to the invention, misch metals (including La, Ce, Nd, and Pr) are preferable to be used as raw materials. Use of the misch metals as raw materials, the use amounts of costly high purity materials such as neodymium and praseodymium can be suppressed and at the same time same effect as that in the case of using the high purity materials can be caused.

In the case the misch metals are used as raw materials, the cerium content in the hydrogen storage alloy of the invention is preferable to be 2.2 mol % or less. When the cerium content is adjusted to be 2.2 mol % or less, decrease of the cycle life can be suppressed. The effect of suppressing the decrease of the cycle life become significant when the cerium content is 1.3 mol % or less. Particularly, when the cerium content is adjusted to be 0.9 mol % or less, the decrease of the cycle life can be suppressed to an extremely low level.

Further, in the case where the above-mentioned misch metals are used as raw materials, in the hydrogen storage alloy of the invention, it is preferable that the total ratio of the $Pr_5Co_{19}$ phase, $Ce_5Co_{19}$ phase, and $Ce_5Ni_7$ phase is 95% by weight or higher. With such configuration, an excellent cycle life is exhibited. Particularly, in the case where the total ratio of these three phases is 98% by weight or higher, the effect becomes furthermore significant. Such an effect is supposedly attributed to the suppression of pulverization owing to the uniform alloy structure.

Next, a method for producing a hydrogen storage alloy of the invention will be described.

A method for producing the first hydrogen storage alloy involves a melting step of melting alloy raw materials mixed at a prescribed composition ratio, a cooling step of rapid solidification the molten alloy raw materials at a cooling speed of 1000 K/s or higher, and an annealing step of annealing the cooled alloy at temperature range of 860° C. or higher and 1000° C. or lower in inert gas atmosphere in pressurized state.

Herein, in the case the composition ratio of the alloy raw materials is defined by a general formula $R1_aR2_bR3_c$ (wherein R1 is one or more kind elements selected from a group consisting of rare earth metals including Y, R2 is one or more kind elements selected from a group consisting of Mg, Ca, Sr, and Ba; R3 is one or more kind elements selected from a group consisting of Ni, Co, Mn, Al, Cr, Fe, Cu, Zn, Si, Sn, V, Nb, Ta, Ti, Zr, and Hf), s, b, and c satisfy $8 \leq s \leq 30$; $1 \leq b \leq 10$; $65 \leq c \leq 90$; and s+b+c=100.

If the hydrogen storage alloy is produced by such a production method, it is made possible to obtain the hydrogen storage alloy having two or more layered crystal phases having crystal structures different from one another.

To explain it more concretely, at first, based on the chemical composition of the aimed hydrogen storage alloy, prescribed amount of a raw material ingot (an alloy raw material) is weighed.

In the melting step, the above-mentioned alloy raw material is put in a crucible and heated at, for example, 1200° C. or higher and 1600° C. or lower, to melt the alloy raw material using a high frequency melting furnace in an inert gas atmosphere or vacuum.

In the cooling step, the melted alloy raw material is cooled and solidified. The cooling speed is preferably 1000 K/s or higher (also referred to as quenching). Quenching at 1000 K/s or higher is effective to make the alloy structure very fine and uniform. Further, the cooling speed can be set in a range of 1,000,000 K/s or lower.

As the cooling method, practically, a melt spinning method at a cooling speed of 100,000 K/s or higher and a gas atomization method at a cooling speed of about 10,000 K/s or higher can preferably be employed.

In the annealing step, in the pressurized state in inert gas atmosphere, heating at 860° C. or higher and 1000° C. or lower may be carried out using, for example, an electric furnace or the like. As the pressurizing condition, it is preferable to be 0.2 MPa (gauge pressure) or higher and 1.0 MPa (gauge pressure) or lower. Further, the treatment time for the annealing step is preferably 8 hours or longer and 50 hours or shorter.

Such an annealing step is effective to release strains of crystal lattice and the hydrogen storage alloy subjected to the annealing step finally becomes the hydrogen storage alloy comprising two or more layered crystal phases having crystal structures different from one another.

A method for producing the second hydrogen storage alloy is the method for producing according to the first hydrogen storage alloy in which the temperature condition of the annealing step is adjusted to be 890° C. or higher and 970° C. or lower.

Adjustment of the condition in such a manner makes diffusion of atoms relatively easy, suppresses evaporation of Mg, Ca, Br, and Ba, easily uniformalizes the length of the a-axis in the respective crystal phases, and gives the hydrogen storage alloy having the difference of 0.08 Å between the maximum value and the minimum value.

In the method for producing the second hydrogen storage alloy, the temperature condition in the annealing step is preferable to be 900° C. or higher and 940° C. or lower. Adjustment of the condition in such a manner is effective to make the concentration distribution of respective constituent elements uniform and make the difference of the a-axis length among the produced phases further shorter.

A method for producing the third hydrogen storage alloy is the method for producing according to the first hydrogen storage alloy in which the ratio of R1 and R2 elements of the alloy raw material and the ratio of R4 and R5 elements are adjusted and the above-mentioned average atom radium rA (Å) and the ratio (B/A) are satisfied in the case of consideration of the atom radius of the respective elements.

Further, in the method for producing the third hydrogen storage alloy, the average atom radium rA (Å) and the ratio (B/A) are preferable to satisfy $1.810 \leq rA \leq 1.825$ and $3.60 \leq (B/A) \leq 3.70$.

Adjustment of the condition in such a manner is effective to maintain the high capacity and at the same time to give further improved cycle performance.

A method for producing the fourth hydrogen storage alloy is the method for producing the first hydrogen storage alloy in which the alloy raw material composition is adjusted to give the composition of the fourth hydrogen storage alloy and the temperature condition in the annealing step is adjusted to be 890° C. or higher and 970° C. or lower.

Adjustment of the condition in such a manner makes diffusion of atom relatively easy and effective to suppress evaporation of Mg, Ca, Sr, and Ba, satisfy the prescribed composition, and obtain the hydrogen storage alloy containing the crystal phase having the $Ce_5Co_{19}$ type crystal structure.

Further, in the method for producing the fourth hydrogen storage alloy, it is more preferable that in the above-mentioned composition $La_hR6_iR7_jMg_kR8_m$, k satisfies $3.4<k<4.3$; R7 consists of one or more kind elements R7' selected from a group consisting of Zr, Zn, and Sn in combination with Ti and is defined as $R7=Ti_tR7'_{j-t}$ (wherein $0 \leq t<0.3$); and R8 consists of one or more kind elements R8' selected from a group consisting of Ni, Co, Cu, Fe, and Cr in combination with Mn and defined as $R8=Mn_sR8'_{m-s}$ (wherein $0<s<1.1$).

Adjustment of the condition in such a manner is effective to maintain the high capacity and at the same time to further improve the cycle performance.

The method for producing the fifth hydrogen storage alloy is the method for producing according to the first hydrogen storage alloy in which the temperature condition in the annealing step is adjusted to be 890° C. or higher and 970° C. or lower.

Adjustment of the condition in such a manner makes diffusion of atom relatively easy and effective to suppress evaporation of Mg, Ca, Sr, and Ba, satisfy the prescribed composition, and obtain the hydrogen storage alloy containing 20% by weight or less of the crystal phase having the $CaCu_5$ type crystal structure.

In the method for producing the fifth hydrogen storage alloy, it is more preferable that in the composition $La_uR9_vMg_wR10_xR11_y$ (wherein, R9 is at least one element of Pr and Nd; R10 is at least one element of Ni and Co; R11 is at least one element of Al and Mn; and u, v, w, x, and y satisfy $4.255 \leq u \leq 17.89$; $0 \leq v \leq 13.62$; $2.128 \leq w \leq 4.701$; $72.30 \leq x \leq 77.66$; and $1.06 \leq y \leq 6.88$).

Adjustment of the condition in such a manner is effective to make Mg, Mn, and Al occupy specified atom sites in the layered structure, stabilize their structure, and suppress production of the crystal phase having the $CaCu_5$ type crystal structure.

A hydrogen storage alloy electrode of the invention is provided with the above-mentioned hydrogen storage alloy as a hydrogen storage medium. At the time of using the hydrogen storage alloy of the invention for an electrode as a heat storage medium, it is preferable to pulverize the hydrogen storage alloy for the use.

The pulverization of the hydrogen storage alloy at the time of electrode production may be carried out either before or after annealing, however, since the surface area becomes wide by the pulverization, in terms of prevention of surface oxidation of the alloy, it is desirable to pulverize the alloy after annealing. The pulverization is preferable to carry out in inert atmosphere for oxidation prevention of the alloy surface.

The pulverization may be carried out by, for example, mechanical pulverization, hydrogenation pulverization, and the like.

Further, a secondary battery of the invention is configured to be a nickel-metal hydride battery using the hydrogen storage alloy as a negative electrode. Since the hydrogen storage alloy of the invention, that is the hydrogen storage alloy electrode, has corrosion resistance to an aqueous strongly alkaline solution to be used as an electrolytic solution of a nickel-metal hydride battery or the like, it is excellent in the cycle performance in the case where hydrogen absorption and release are repeatedly carried out. As a result, the charge and discharge cycle performance of the secondary battery also become excellent.

In addition, as a positive electrode of the secondary battery, for example, nickel electrode (sintered type or non-sintered type) is employed.

EXAMPLES

Hereinafter, the invention will be described more practically, referring to Examples and Comparative Examples; however the invention should not be limited to the following Examples.

Example 1

A prescribed amount of a raw material ingot having the chemical composition shown in Table 1 was weighed, put in a crucible, and heated at 1500° C. in reduced pressure argon atmosphere using a high frequency melting furnace to melt the material. After the melting, the melted alloy was quenched by employing a melt spinning method and solidified.

Next, the obtained alloy was heated at 910° C. in 0.2 MPa (gauge pressure, hereinafter the same) of pressurized argon gas.

Comparative Example 1

A prescribed amount of a raw material ingot having the chemical composition shown in Table 1 was weighed, put in a crucible, and heated at 1500° C. in reduced pressure argon atmosphere using a high frequency melting furnace to melt the material. After the melting, the melted alloy was quenched by employing a melt spinning method and solidified.

Next, the obtained alloy was heated at 9100° C. in 0.2 MPa (gauge pressure, hereinafter the same) of pressurized argon gas.

TABLE 1

|  | La | Pr | Mg | Ni | Co | Al |
|---|---|---|---|---|---|---|
| Example 1 | 13.3 | 4.2 | 3.3 | 71.9 | 4.2 | 3.1 |
| Comparative Example 1 | 12.8 | 4.3 | 4.3 | 68.1 | 6.4 | 4.3 |

<Measurement of Crystal Structure and Calculation of Existence Ratio>

Each obtained hydrogen storage alloy was pulverized to obtain a powder with an average particle diameter (D50) of 20 μm and the powder was subjected to measurement under condition of 40 kV and 100 mA (Cu bulb) using an X-ray diffraction apparatus (manufactured by Bruker AXS: model number M06XCE). Further, as structure analysis, analysis by Rietveld method (analysis software: RIETAN 2000) was carried and the production ratios of the produced crystal phases in each hydrogen storage alloy were calculated.

The ratios (% by weight) of the produced phases are shown in Table 2.

TABLE 2

| | $Ce_5Co_{19}$ phase | $Pr_5Co_{19}$ phase | $CaCu_5$ phase | $AuBe_5$ phase | Total |
|---|---|---|---|---|---|
| Example 1 | 62.7 | 28.5 | 8.74 | 0.0 | 100 |
| Comparative example 1 | 69.1 | 16.1 | 11.8 | 3.0 | 100 |

<Evaluation of Distribution State of Crystal Phase>

With respect to the obtained hydrogen storage alloy powders of Example and Comparative Example, the distribution state (color map) of Ni and Mg was observed using EPMA (Electron Probe Micro Analyzer) to evaluate the distribution state of produced phases. With respect to Example 1 and Comparative Example 1, FIG. 4 shows photographs of the distribution state (color map) of Ni and Mg obtained by EPMA.

Figure 4:
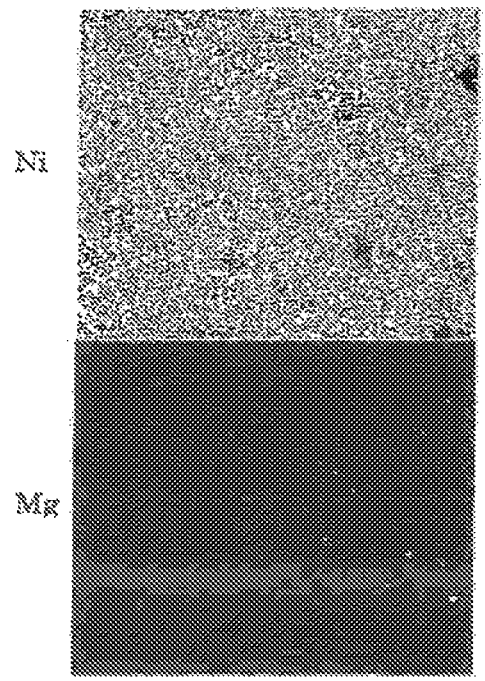
FIG. 4: A photograph showing the distribution of Ni and Mg obtained by EPMA, with respect to Example 1 and Comparative Example 1.
Figure 4:
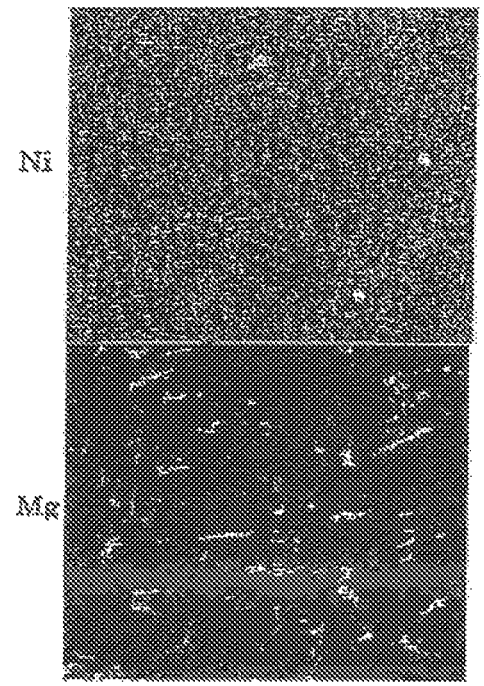

As shown in FIG. 4, it is observed that both Ni and Mg were distributed uniformly in the hydrogen storage alloy of Example and according to Rietveld analysis result or the like for the alloy, it was confirmed that a plurality of phases were produced and as comprehensive analysis of these results, it could be confirmed that the crystal phases existed in layered state in the hydrogen storage alloy. On the other hand, in the hydrogen storage alloy of Comparative Example, Ni and Mg were distributed ununiformly in places and thus it was supposed that the crystal phases separately existed without forming a layered body. In addition, when the lattice image of the hydrogen storage alloy of Example 1 was observed by transmission electron microscope (TEM), the crystal phases with the crystal structures different from one another were layered in the c-axis direction.

<Evaluation of Cycle Performance>

(a) Production of Electrode

After 3 parts by weight of a nickel powder (manufactured by INCO, #210) was added to 100 parts by weight of each of the obtained hydrogen storage alloy powders of Example and Comparative Example, an aqueous solution in which a thickener (methyl cellulose) was dissolved was added and further 1.5 parts by weight of a binder (styrene-butadiene rubber) was added to obtain a paste which was applied to both faces of a punched steel plate (porosity 60%) with a thickness of 46 μm and dried and thereafter pressed in 0.36 mm thickness to obtain a negative electrode. On the other hand, a sintered type nickel hydroxide electrode with an excess capacity was used as a positive electrode.

(b) Production of Flooded Cell

The negative electrode produced in the above-mentioned manner was sandwiched with positive electrodes while inserting separators between them and these electrodes were fixed with bolts at pressure of 1 kgf/cm$^2$ to assemble an opened type cell. A mixed solution of a 6.8 mol/L KOH solution and a 0.8 mol/L LiOH solution was used as an electrolyte solution.

(c) Measurement Method of Discharge Capacity

In a water bath at 20° 0, charging and discharging was repeated 65 cycles in condition of charging at 0.1 ItA to 150%, discharging at 0.2 ItA to cut off voltage of –0.6 V (vs. Hg/HgO). The results are shown in FIG. 5.

Figure 5:
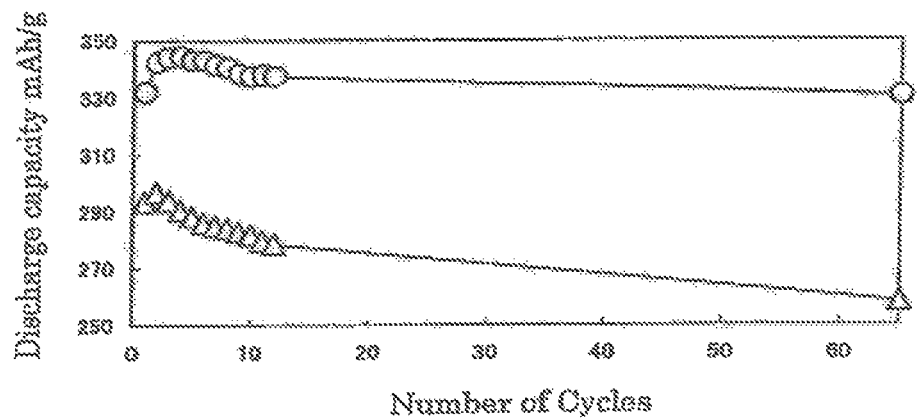
FIG. 5: A graph showing the measurement results of cycle life, with respect to hydrogen storage alloys of Example 1 and Comparative Example 1.

As shown in FIG. 5, with respect to the hydrogen storage alloy of Comparative Example 1 in which the crystal phases existed separately, the discharge capacity was lowered to about 88% after the 65 cycles, whereas with respect to the hydrogen storage alloy of Example 1, it was confirmed that the discharge capacity was maintained at 99.7% even after 65 cycles.

Examples 2 to 6

Using the alloy materials with the compositions shown in the following Table 3, hydrogen storage alloys of Examples 2 to 6 were produced in the same manner as Example 1. When the lattice images of these hydrogen storage alloys were observed by a transmission electron microscope (TEM), it was confirmed that crystal phases with different crystal structures were layered in the c-axis direction.

TABLE 3

| | La | Pr | Mg | Ni | Co | Mn | Al |
|---|---|---|---|---|---|---|---|
| | | | | | | | Unit: mol % |
| Example 2 | 12.58 | 4.19 | 4.19 | 71.28 | 2.10 | 2.10 | 2.10 |
| Example 3 | 17.19 | 0.00 | 3.77 | 68.13 | 6.29 | 0.00 | 3.14 |
| Example 4 | 9.64 | 8.18 | 3.14 | 75.89 | 0.00 | 0.00 | 1.68 |
| Example 5 | 4.30 | 14.46 | 2.09 | 77.50 | 1.65 | 0.00 | 0.00 |
| Example 6 | 5.01 | 14.08 | 2.12 | 74.50 | 4.29 | 0.00 | 0.00 |

<Measurement of a-Axis Length>

Figure 6:
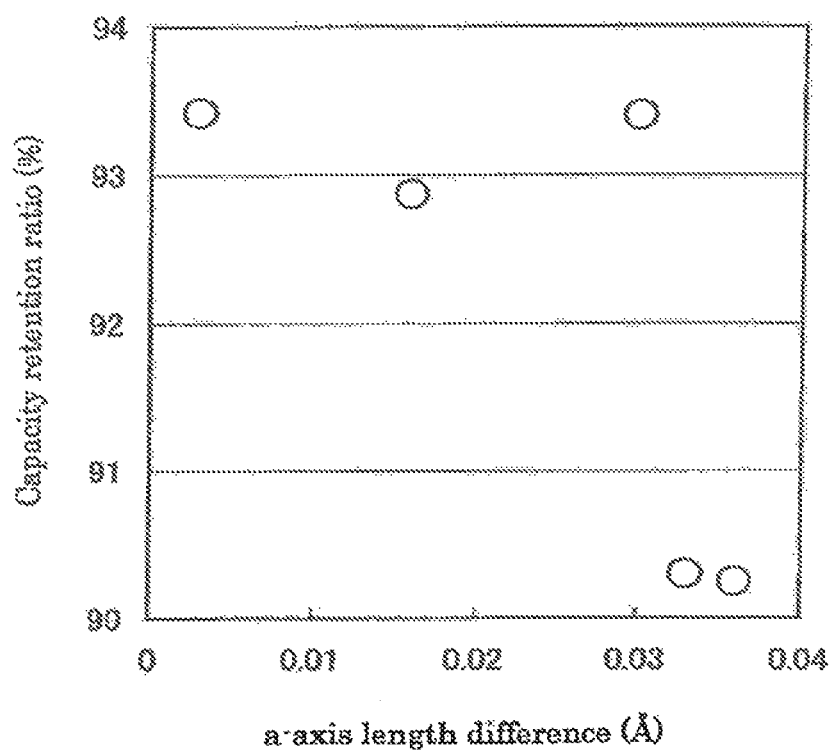
FIG. 6: A graph showing a relation of the difference of the a-axis length and the capacity retention ratio, with respect to the hydrogen storage alloys of Examples 2 and 6.

With respect to each of the obtained hydrogen storage alloys, the production ratios of the crystal phases were calculated and at the same time, the XRD patterns were measured by an X-ray diffraction apparatus and the a-axis length for each produced crystal phase was calculated by Rietveld method (analysis software: RIETAN 2000). The results are shown in the following Table 4 and FIG. 6.

Further, in the same manner as Example 1, the ratios of the produced phases of each hydrogen storage alloy and the retention ratio of the discharge capacity after 50 cycles were measured. The results are also shown in Table 4.

TABLE 4

| | Ratios of produced crystal phase (% by weight) [A-axis length (Å)] | | | | A-axis length difference (Å) | Capacity retention ratio (%) |
|---|---|---|---|---|---|---|
| | $Ce_2Ni_7$ phase | $Ce_5Co_{19}$ phase | $Pr_5Co_{19}$ phase | $CaCu_5$ phase | | |
| Example 2 | 36.95 [5.045] | 38.26 [5.044] | 14.04 [5.044] | 10.75 [5.043] | 0.003 | 93.42 |

TABLE 4-continued

| | Ratios of produced crystal phase (% by weight) [A-axis length (Å)] | | | | A-axis length difference (Å) | Capacity retention ratio (%) |
|---|---|---|---|---|---|---|
| | Ce₂Ni₇ phase | Ce₅Co₁₉ phase | Pr₅Co₁₉ phase | CaCu₅ phase | | |
| Example 3 | 26.43 [5.066] | 35.11 [5.088] | 20.42 [5.059] | 18.04 [5.050] | 0.016 | 92.87 |
| Example 4 | 42.32 [5.028] | 37.89 [5.017] | 13.13 [5.020] | 6.67 [4.992] | 0.036 | 90.25 |
| Example 5 | 32.9 [5.025] | 40.0 [5.015] | 12.6 [5.022] | 14.5 [4.992] | 0.033 | 90.3 |
| Example 6 | 51.3 [5.033] | 30.6 [5.029] | 8.50 [5.034] | 9.60 [5.004] | 0.030 | 93.4 |

Examples 7 to 42

Using the alloy raw materials of the compositions shown in the following Table 5, hydrogen storage alloys of Examples 7 to 42 were produced in the same manner as Example 1. When the lattice images of these hydrogen storage alloys were observed by a transmission electron microscope (TEM), it was confirmed that crystal phases with different crystal structures were layered in the c-axis direction.

Comparative Example 2

Similarly, using the allow raw material shown in Table 5, a hydrogen storage alloy of Comparative Example 2 was produced in the same manner as Comparative Example 1.

TABLE 5

| | Raw material composition | | | | | | | | | | | | |
|---|---|---|---|---|---|---|---|---|---|---|---|---|---|
| | La | Ce | Pr | Nd | Sm | Y | Mg | Ni | Co | Mn | Al | B/A | Main produced phase |
| Example 7 | 12.4 | 0.0 | 4.1 | 0.0 | 0.0 | 0.0 | 4.1 | 71.1 | 4.1 | 1.0 | 3.1 | 3.85 | Ce2Ni7 |
| Example 8 | 12.8 | 0.0 | 4.3 | 0.0 | 0.0 | 0.0 | 4.3 | 70.2 | 4.3 | 1.1 | 3.2 | 3.70 | Pr5Co19 |
| Example 9 | 12.9 | 0.0 | 4.3 | 0.0 | 0.0 | 0.0 | 4.3 | 69.9 | 4.3 | 1.1 | 3.2 | 3.65 | Pr5Co19 |
| Example 10 | 13.2 | 0.0 | 4.4 | 0.0 | 0.0 | 0.0 | 4.4 | 69.1 | 4.4 | 1.1 | 3.3 | 3.53 | Pr5Co19 |
| Example 11 | 13.4 | 0.0 | 4.5 | 0.0 | 0.0 | 0.0 | 4.5 | 68.8 | 4.5 | 1.1 | 3.3 | 3.48 | Ce2Ni7 |
| Example 12 | 13.8 | 0.0 | 3.1 | 0.0 | 0.0 | 0.0 | 3.7 | 71.1 | 4.1 | 1.0 | 3.1 | 3.85 | Ce5Co19 |
| Example 13 | 16.5 | 0.0 | 2.1 | 0.0 | 0.0 | 0.0 | 2.1 | 71.1 | 4.1 | 1.0 | 3.1 | 3.85 | Pr5Co19 |
| Example 14 | 17.2 | 0.0 | 0.0 | 0.0 | 0.0 | 0.0 | 4.3 | 71.0 | 4.3 | 0.0 | 3.2 | 3.65 | Ce5Co19 |
| Example 15 | 14.1 | 0.0 | 3.7 | 0.0 | 0.0 | 0.0 | 3.9 | 71.7 | 4.3 | 0.0 | 2.2 | 3.60 | Pr5Co19 |
| Example 16 | 13.0 | 0.0 | 0.0 | 4.3 | 0.0 | 0.0 | 4.3 | 72.8 | 2.2 | 0.0 | 3.3 | 3.60 | Pr5Co19 |
| Example 17 | 13.0 | 0.0 | 0.0 | 5.2 | 0.0 | 0.0 | 3.5 | 72.8 | 2.2 | 0.0 | 3.3 | 3.60 | Pr5Co19 |
| Example 18 | 9.8 | 0.0 | 6.5 | 1.1 | 0.0 | 0.0 | 4.3 | 71.7 | 4.3 | 0.0 | 2.2 | 3.60 | Pr5Co19 |
| Example 19 | 6.5 | 0.0 | 10.9 | 0.0 | 0.0 | 0.0 | 4.3 | 71.7 | 4.3 | 0.0 | 2.2 | 3.60 | Ce2Ni7 |
| Example 20 | 12.8 | 0.0 | 0.0 | 3.2 | 0.0 | 0.0 | 5.3 | 72.3 | 4.3 | 0.0 | 2.1 | 3.70 | PuNi3 |
| Example 21 | 12.8 | 0.0 | 0.0 | 5.3 | 0.0 | 0.0 | 3.2 | 72.3 | 4.3 | 0.0 | 2.1 | 3.70 | Pr5Co19 |
| Example 22 | 17.9 | 0.0 | 0.0 | 1.1 | 0.0 | 0.0 | 2.3 | 72.3 | 4.3 | 0.0 | 2.1 | 3.70 | Pr5Co19 |
| Example 23 | 3.9 | 8.7 | 1.1 | 4.3 | 0.2 | 0.0 | 3.5 | 71.7 | 4.3 | 0.0 | 2.2 | 3.60 | Ce2Ni7 |
| Example 24 | 14.0 | 0.0 | 0.0 | 2.1 | 0.0 | 2.1 | 3.0 | 73.4 | 2.1 | 1.1 | 2.1 | 3.70 | Ce5Co19 |
| Example 25 | 12.5 | 0.0 | 0.0 | 0.0 | 0.0 | 4.2 | 4.2 | 69.8 | 6.3 | 0.0 | 3.1 | 3.80 | Ce5Co19 |
| Example 26 | 12.9 | 0.0 | 0.0 | 0.0 | 0.0 | 4.6 | 3.3 | 69.8 | 6.3 | 0.0 | 3.1 | 3.80 | Ce5Co19 |
| Example 27 | 14.8 | 0.2 | 0.0 | 0.0 | 0.0 | 2.9 | 2.9 | 69.8 | 6.3 | 0.0 | 3.1 | 3.80 | Ce5Co19 |
| Example 28 | 15.8 | 0.0 | 0.0 | 0.0 | 0.0 | 2.5 | 2.5 | 69.8 | 6.3 | 0.0 | 3.1 | 3.80 | Ce2Ni7 |
| Example 29 | 14.8 | 2.1 | 0.0 | 0.0 | 0.0 | 0.0 | 3.7 | 73.2 | 4.1 | 0.0 | 2.1 | 3.85 | Ce5Co19 |
| Example 30 | 14.5 | 2.0 | 0.0 | 0.0 | 0.0 | 0.0 | 3.6 | 73.7 | 4.0 | 0.0 | 2.0 | 3.95 | Ce5Co19 |
| Example 31 | 16.1 | 0.0 | 2.2 | 0.0 | 0.0 | 0.0 | 4.0 | 69.9 | 4.5 | 0.0 | 3.3 | 3.48 | Ce2Ni7 |
| Example 32 | 11.0 | 0.0 | 0.0 | 6.6 | 0.0 | 0.0 | 4.4 | 69.1 | 5.5 | 0.0 | 3.3 | 3.53 | Ce5Co19 |
| Example 33 | 11.2 | 0.0 | 0.0 | 6.7 | 0.0 | 0.0 | 4.5 | 69.9 | 4.5 | 0.0 | 3.3 | 3.48 | Ce5Co19 |
| Example 34 | 12.8 | 0.0 | 4.3 | 0.0 | 0.0 | 0.0 | 4.3 | 70.2 | 4.3 | 0.0 | 4.3 | 3.70 | Ce5Co19 |
| Example 35 | 16.3 | 0.0 | 0.0 | 0.0 | 0.0 | 0.0 | 5.4 | 71.7 | 4.3 | 0.0 | 2.2 | 3.60 | PuNi3 |
| Example 36 | 13.9 | 0.0 | 0.0 | 4.8 | 0.0 | 0.0 | 3.0 | 71.4 | 4.3 | 0.0 | 2.6 | 3.62 | Pr5Co19 |
| Example 37 | 13.9 | 0.0 | 0.0 | 4.3 | 0.0 | 0.0 | 3.5 | 71.4 | 4.3 | 0.0 | 2.6 | 3.62 | Pr5Co19 |
| Example 38 | 14.1 | 0.0 | 0.0 | 4.3 | 0.0 | 0.0 | 3.2 | 71.4 | 4.3 | 0.0 | 2.6 | 3.62 | Pr5Co19 |
| Example 39 | 15.2 | 0.0 | 0.0 | 3.2 | 0.0 | 0.0 | 3.2 | 71.4 | 4.3 | 0.0 | 2.6 | 3.62 | Pr5Co19 |
| Example 40 | 15.4 | 0.0 | 0.0 | 3.3 | 0.0 | 0.0 | 3.3 | 71.1 | 4.4 | 0.0 | 2.6 | 3.56 | Pr5Co19 |
| Example 41 | 16.4 | 0.0 | 0.0 | 2.2 | 0.0 | 0.0 | 3.3 | 71.1 | 4.4 | 0.0 | 2.6 | 3.56 | Pr5Co19 |
| Example 42 | 3.8 | 0.0 | 7.6 | 7.6 | 0.0 | 0.0 | 3.3 | 73.3 | 0.0 | 0.0 | 4.4 | 3.50 | Ce2Ni7 |
| Comparative example 2 | 11.5 | 3.9 | 0.2 | 0.8 | 0.0 | 0.0 | 0.0 | 67.2 | 4.9 | 6.6 | 4.9 | 5.10 | CaCu5 |

TABLE 5-continued

| | rA Å | Produced phase (%) | | | | | Capacity mAh/g | Capacity retention ratio % | Evaluation |
|---|---|---|---|---|---|---|---|---|---|
| | | Ce2Ni7 | Pr5Co19 | Ce5Co19 | La4MgNi24 | CaCu5 | Others | | | |
| Example 7 | 1.8122 | 43 | 6 | 32 | 5 | 14 | | 351 | 89.3 | |
| Example 8 | 1.8122 | 18 | 34 | 21 | 21 | 6 | | 352 | 94.5 | ● |
| Example 9 | 1.8122 | 28 | 50 | 12 | 6 | 4 | | 349 | 96 | ● |
| Example 10 | 1.8122 | 40 | 42 | 10 | 4 | 4 | | 347 | 95.4 | ● |
| Example 11 | 1.8122 | 50 | 30 | 9 | | 11 | | 340 | 91.6 | ○ |
| Example 12 | 1.8202 | 32 | 17 | 44 | | 7 | | 354 | 92.9 | ○ |
| Example 13 | 1.8446 | | 55 | 33 | | 12 | | 325 | 88.6 | Δ |
| Example 14 | 1.822 | 20 | 28 | 42 | | 10 | | 355 | 91.3 | ○ |
| Example 15 | 1.8192 | 20 | 42 | 34 | | 4 | | 350 | 97 | ● |
| Example 16 | 1.8108 | 10 | 45 | 40 | | 5 | | 348 | 97.5 | ● |
| Example 17 | 1.8196 | 26 | 60 | 14 | | | | 347 | 97.8 | ● |
| Example 18 | 1.8045 | 36 | 40 | 20 | | 4 | | 350 | 96.5 | ● |
| Example 19 | 1.7975 | 45 | 18 | 30 | | 7 | | 324 | 94.6 | ○ |
| Example 20 | 1.7999 | | 15 | 19 | | 32 | 34 | 321 | 90.6 | Δ |
| Example 21 | 1.8218 | | 58 | 36 | | 6 | | 354 | 97.5 | ● |
| Example 22 | 1.844 | 24 | 55 | 17 | | 4 | | 337 | 92.6 | Δ |
| Example 23 | 1.7978 | 39 | 19 | 32 | | 10 | | 325 | 88 | Δ |
| Example 24 | 1.8253 | 30 | 28 | 31 | | 6 | 5 | 347 | 96 | ● |
| Example 25 | 1.8068 | 22 | 15 | 40 | | 10 | 13 | 360 | 92.7 | ○ |
| Example 26 | 1.8163 | 20 | 19 | 34 | | 7 | 20 | 355 | 94.9 | ● |
| Example 27 | 1.8273 | 18 | 22 | 31 | 5 | 6 | 18 | 350 | 94.1 | ● |
| Example 28 | 1.8349 | 35 | 25 | 30 | | 10 | | 331 | 90.4 | Δ |
| Example 29 | 1.8223 | 16 | 20 | 48 | | 16 | | 358 | 91.5 | ○ |
| Example 30 | 1.8223 | | 20 | 58 | | 22 | | 352 | 91.3 | ○ |
| Example 31 | 1.8226 | 55 | 14 | 21 | | 10 | | 326 | 88.6 | Δ |
| Example 32 | 1.8052 | 31 | 23 | 39 | | 7 | | 341 | 94.1 | ● |
| Example 33 | 1.8052 | 37 | 11 | 41 | | 11 | | 331 | 92.1 | Δ |
| Example 34 | 1.8122 | 18 | | 38 | 37 | 7 | | 337 | 93 | ○ |
| Example 35 | 1.8083 | 21 | | 13 | | 29 | 37 | 341 | 88.9 | ○ |
| Example 36 | 1.8262 | | 55 | 38 | | 7 | | 346 | 94.9 | ● |
| Example 37 | 1.8218 | 7 | 47 | 43 | | 3 | | 348 | 95.2 | ● |
| Example 38 | 1.8246 | | 50 | 45 | | 5 | | 347 | 95 | ● |
| Example 39 | 1.8274 | | 53 | 44 | | 3 | | 352 | 95.3 | ● |
| Example 40 | 1.8274 | 8 | 47 | 42 | | 3 | | 351 | 95.3 | ● |
| Example 41 | 1.8302 | 39 | 26 | 35 | | | | 357 | 90.6 | ○ |
| Example 42 | 1.8001 | 92 | 3 | 5 | | | | 337 | 92.6 | Δ |
| Comparative example 2 | 1.8612 | | | | | 100 | | 307 | 97.5 | ○ |

With respect to the hydrogen storage alloys of Examples 7 to 42 and Comparative Example 2, the production ratios of the crystal phases were calculated and cycle performance measurement was carried out as same as Example 1. The maximum values of the discharge capacity and retention ratios of discharge capacity at 50 cycles are shown in Table 5. Those having the maximum values of the discharge capacity of 340 mAh/g or higher and retention ratio of the discharge capacity at 93% or higher are marked with ●: those which satisfy either one were marked with ○: and those which satisfy neither were marked with Δ. The results are shown together in Table 5.

Figure 7:
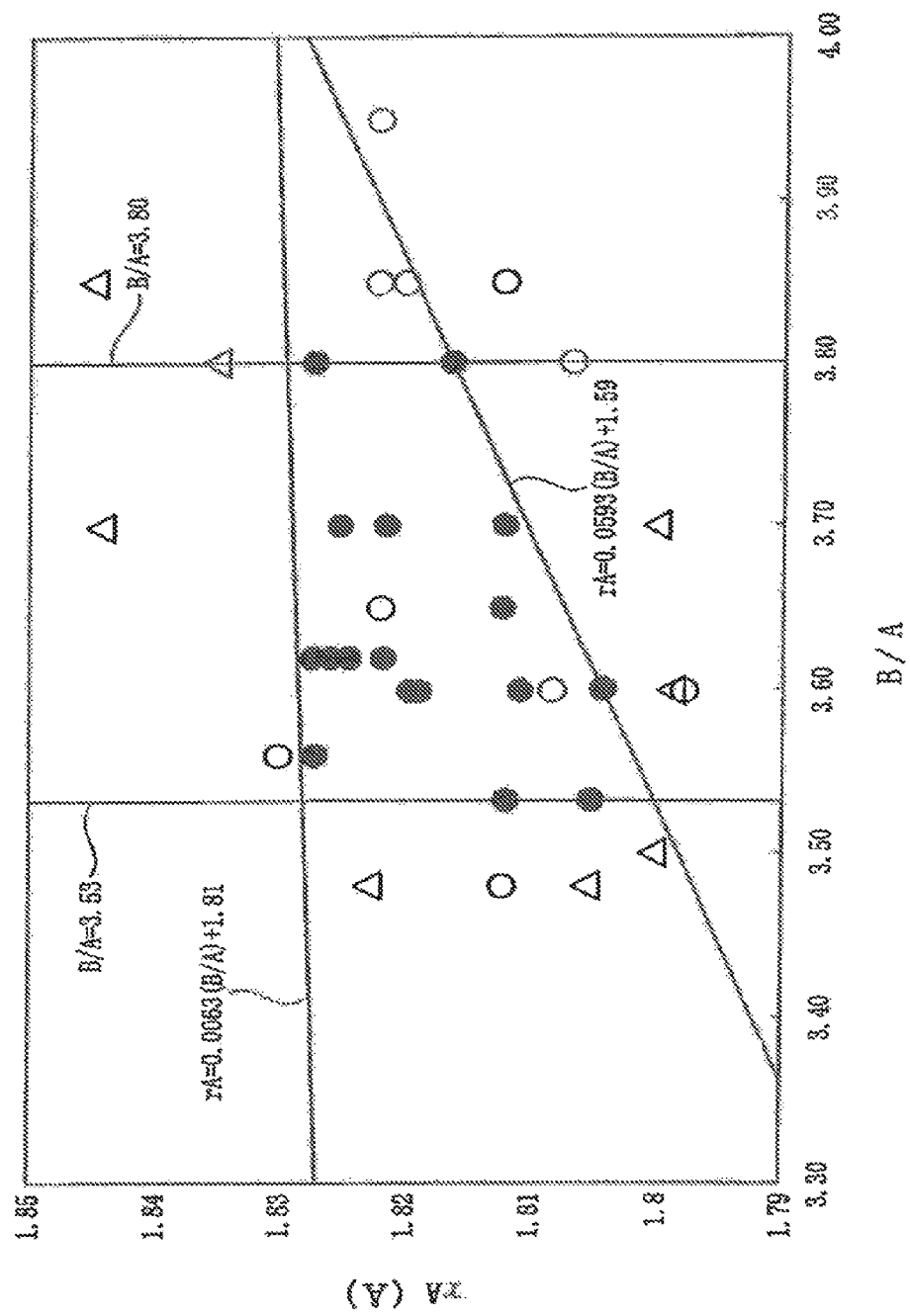
FIG. 7: A graph formed by plotting the evaluation results of the cycle life and discharge capacity using B/A and rA (Å) as coordinate axes, with respect to hydrogen storage alloys of Examples 7 to 42.

Further, the calculation results of average atom radius rA (Å) of the above-mentioned R1 element and R2 element (elements at A side) and the ratio (B/A) are shown together in Table 5 and the graph formed by plotting the evaluation results in the B/A-rA (Å) coordinate is shown in FIG. 7.

As shown in FIG. 7, in the case of using the hydrogen storage alloys of Examples which satisfy 3.53≤(B/A)≤3.80 and 0.0593(B/A)+1.59≤rA≤0.0063(B/A)+1.81, that almost all of them exhibited excellent discharge capacity and cycle performance.

Further, from Table 5, in the case rA and B/A satisfy the above-mentioned expressions, respectively, the main produced phase tends to be $Pr_5Co_{19}$ phase or $Ce_5Co_{19}$ phase and it was confirmed that excellent discharge capacity and cycle performance were exhibited.

Furthermore, from Table 5, with respect to Examples 15 to 18, 21, 24 to 27, 32, 34, and 35 to 40 which satisfies the following: the R1 is one or more kind elements R1' selected from a group consisting of Ce, Pr, Nd, Sm, and Y and La at La/R1' ratio of 5 or less; the R2 is Mg; the R4 is one or two elements selected from Ni and Co; the R is Al; and d, e, f, and g respectively satisfy 16≤d≤19; 2≤e≤5; 73≤f≤78; and 2≤g≤4, $Pr_5Co_{19}$ phase and $Ce_5Co_{19}$ phase were produced preferentially and the uniformity of the alloys was improved.

Examples 43 to 81

Using the alloy raw materials of the compositions shown in the following Table 6, hydrogen storage alloys of Examples 48 to 81 were produced in the same manner as Example 1. When the lattice images of these hydrogen storage alloys were observed by a transmission electron microscope (TEM), it was confirmed that crystal phases with different crystal structures were layered in the c-axis direction.

With respect to the obtained hydrogen storage alloys, the production ratios of the crystal phases were calculated and cycle performance (the maximum values of the discharge capacity and retention ratios of discharge capacity at 50 cycles) measurement was carried out as same as Example 1. The results are shown together in Table 6. The above-mentioned La/R1' ratios are also shown in Table 6.

TABLE 6

| | Alloy composition (mol %) | | | | | | | | | | | | | | | | | |
|---|---|---|---|---|---|---|---|---|---|---|---|---|---|---|---|---|---|---|
| | La | Ce | Pr | Nd | Y | Zr | Ti | V | Sn | Zn | Mg | Ni | Co | Mn | Al | Fe | Cu | Si |
| Example 43 | 8.3 | | | 8.5 | | 0.2 | | | | | 4.3 | 68.1 | 6.4 | 2.1 | 2.1 | | | | 100 |
| Example 44 | 11.7 | | | 5.1 | | 0.2 | | | | | 4.3 | 68.1 | 6.4 | 2.1 | 2.1 | | | | 100 |
| Example 45 | 13.6 | | | 3.2 | | 0.2 | | | | | 4.3 | 68.1 | 6.4 | 2.1 | 2.1 | | | | 100 |
| Example 46 | 14.3 | | | 2.6 | | 0.2 | | | | | 4.3 | 68.1 | 6.4 | 2.1 | 2.1 | | | | 100 |
| Example 47 | 14.7 | | | 2.1 | | 0.2 | | | | | 4.3 | 68.1 | 6.4 | 2.1 | 2.1 | | | | 100 |
| Example 48 | 16.8 | | | 0.0 | | 0.2 | | | | | 4.3 | 68.1 | 6.4 | 2.1 | 2.1 | | | | 100 |
| Example 49 | 17.9 | | | 2.1 | | 0.2 | | | | | 1.1 | 68.1 | 6.4 | 2.1 | 2.1 | | | | 100 |
| Example 50 | 16.8 | | | 2.1 | | 0.2 | | | | | 2.1 | 68.1 | 6.4 | 2.1 | 2.1 | | | | 100 |
| Example 51 | 16.2 | | | 2.1 | | 0.2 | | | | | 2.8 | 68.1 | 6.4 | 2.1 | 2.1 | | | | 100 |
| Example 52 | 13.6 | | | 2.1 | | 0.2 | | | | | 5.3 | 68.1 | 6.4 | 2.1 | 2.1 | | | | 100 |
| Example 53 | 12.6 | | | 2.1 | | 0.2 | | | | | 6.4 | 68.1 | 6.4 | 2.1 | 2.1 | | | | 100 |
| Example 54 | 13.4 | | | 4.3 | | 0.2 | | | | | 3.4 | 68.1 | 6.4 | 2.1 | 2.1 | | | | 100 |
| Example 55 | 14.5 | | | 3.2 | | 0.2 | | | | | 3.4 | 68.1 | 6.4 | 2.1 | 2.1 | | | | 100 |
| Example 56 | 14.5 | 3.2 | | | | 0.2 | | | | | 3.4 | 68.1 | 6.4 | 2.1 | 2.1 | | | | 100 |
| Example 57 | 14.5 | | 3.2 | | | 0.2 | | | | | 3.4 | 68.1 | 6.4 | 2.1 | 2.1 | | | | 100 |
| Example 58 | 14.5 | | | | 3.2 | 0.2 | | | | | 3.4 | 68.1 | 6.4 | 2.1 | 2.1 | | | | 100 |
| Example 59 | 14.5 | | | 3.4 | | | | | | | 3.4 | 68.1 | 6.4 | 2.1 | 2.1 | | | | 100 |
| Example 60 | 14.5 | | | 2.8 | | | 0.6 | | | | 3.4 | 68.1 | 6.4 | 2.1 | 2.1 | | | | 100 |
| Example 61 | 14.5 | | | 2.3 | | | 1.1 | | | | 3.4 | 68.1 | 6.4 | 2.1 | 2.1 | | | | 100 |
| Example 62 | 14.5 | | | 3.2 | | | | 0.2 | | | 3.4 | 68.1 | 6.4 | 2.1 | 2.1 | | | | 100 |
| Example 63 | 14.5 | | | 3.2 | | | | | 0.2 | | 3.4 | 68.1 | 6.4 | 2.1 | 2.1 | | | | 100 |
| Example 64 | 14.5 | | | 3.2 | | | | | | 0.2 | 3.4 | 68.1 | 6.4 | 2.1 | 2.1 | | | | 100 |
| Example 65 | 16.6 | | | 3.7 | | 0.2 | | | | | 3.9 | 63.4 | 7.3 | 2.4 | 2.4 | | | | 100 |
| Example 66 | 15.1 | | | 3.3 | | 0.2 | | | | | 3.6 | 66.7 | 6.7 | 2.2 | 2.2 | | | | 100 |
| Example 67 | 14.2 | | | 3.1 | | 0.2 | | | | | 3.3 | 68.8 | 6.3 | 2.1 | 2.1 | | | | 100 |
| Example 68 | 13.3 | | | 2.9 | | 0.2 | | | | | 3.1 | 70.6 | 5.9 | 2.0 | 2.0 | | | | 100 |
| Example 69 | 14.5 | | | 3.2 | | 0.2 | | | | | 3.4 | 68.1 | 6.4 | | 4.3 | | | | 100 |
| Example 70 | 14.5 | | | 3.2 | | 0.2 | | | | | 3.4 | 68.1 | 4.3 | 2.1 | 2.1 | 2.1 | | | 100 |
| Example 71 | 14.5 | | | 3.2 | | 0.2 | | | | | 3.4 | 68.1 | 4.3 | 2.1 | 2.1 | | 2.1 | | 100 |
| Example 72 | 14.5 | | | 3.2 | | 0.2 | | | | | 3.4 | 68.1 | 4.3 | 2.1 | 2.1 | | | 2.1 | 100 |
| Example 73 | 14.8 | | | 3.3 | | 0.2 | | | | | 3.5 | 69.6 | 4.3 | 1.1 | 3.3 | | | | 100 |
| Example 74 | 14.5 | | | 3.2 | | 0.2 | | | | | 3.4 | 70.2 | 4.3 | 1.1 | 3.2 | | | | 100 |
| Example 75 | 14.2 | | | 3.1 | | 0.2 | | | | | 3.3 | 70.8 | 4.2 | 1.0 | 3.1 | | | | 100 |
| Example 76 | 13.9 | | | 3.1 | | 0.2 | | | | | 3.3 | 71.4 | 4.1 | 1.0 | 3.1 | | | | 100 |
| Example 77 | 13.6 | | | 3.0 | | 0.2 | | | | | 3.2 | 72.0 | 4.0 | 1.0 | 3.0 | | | | 100 |
| Example 78 | 14.9 | | | 4.0 | | 0.0 | | | | | 3.1 | 74.7 | 0.0 | | 3.3 | | | | 100 |
| Example 79 | 14.9 | | | 3.5 | | 0.0 | | | | | 3.5 | 70.3 | 4.4 | | 3.3 | | | | 100 |
| Example 80 | 14.6 | | | 3.4 | | 0.0 | | | | | 3.4 | 68.8 | 4.3 | 2.2 | 3.2 | | | | 100 |
| Example 81 | 4.7 | | 8.1 | 7.0 | | 0.0 | | | | | 3.5 | 72.1 | 2.3 | 0.0 | 2.3 | | | | 100 |

| | | Produced phases (% by weight) | | | | | | | Capacity | Capacity retention |
|---|---|---|---|---|---|---|---|---|---|---|
| | La/R1' | AB2 | Ce2Ni7 | Gd2Co7 | Pr5Co19 | Ce5Co19 | CaCu5 | Others | Total | mAh/g | ratio % |
| Example 43 | 0.49 | 3 | 41 | | 8 | 33 | 15 | | 100 | 336 | 94.9 |
| Example 44 | 0.70 | 1 | 39 | | 10 | 40 | 10 | | 100 | 360 | 96.4 |
| Example 45 | 0.81 | | 41 | | 9 | 41 | 9 | | 100 | 364 | 96.3 |
| Example 46 | 0.85 | | 38 | | 12 | 37 | 13 | | 100 | 368 | 96.1 |
| Example 47 | 0.87 | | 30 | | 14 | 37 | 19 | | 100 | 370 | 94 |
| Example 48 | 1.00 | | 26 | | 15 | 35 | 24 | | 100 | 365 | 93.1 |
| Example 49 | 0.89 | | 46 | | 14 | 30 | 10 | | 100 | 125 | 99.7 |
| Example 50 | 0.89 | | 45 | | 17 | 29 | 9 | | 100 | 252 | 99.5 |
| Example 51 | 0.88 | | 44 | | 14 | 31 | 11 | | 100 | 335 | 98.1 |
| Example 52 | 0.86 | | | | 20 | 35 | 45 | | 100 | 331 | 93.6 |
| Example 53 | 0.86 | | | | 2 | 42 | 56 | | 100 | 285 | 93.5 |
| Example 54 | 0.76 | | | | 30 | 66 | 4 | | 100 | 363 | 97 |
| Example 55 | 0.82 | | | | 31 | 64 | 5 | | 100 | 368 | 97.1 |
| Example 56 | 0.82 | | 23 | | 21 | 48 | 8 | | 100 | 357 | 95.1 |
| Example 57 | 0.82 | | | | 24 | 70 | 6 | | 100 | 368 | 97 |
| Example 58 | 0.82 | | 4 | 4 | 20 | 62 | 10 | | 100 | 369 | 95.9 |
| Example 59 | 0.81 | | | | 31 | 66 | 3 | | 100 | 372 | 95 |
| Example 60 | 0.84 | | 5 | | 24 | 52 | 17 | 2 | 100 | 351 | 96.9 |
| Example 61 | 0.86 | | 10 | | 21 | 42 | 23 | 4 | 100 | 336 | 96.1 |
| Example 62 | 0.82 | | | | 31 | 64 | 5 | | 100 | 361 | 96.9 |
| Example 63 | 0.82 | | | | 31 | 64 | 5 | | 100 | 358 | 96.8 |
| Example 64 | 0.82 | | | | 31 | 64 | 5 | | 100 | 361 | 97 |
| Example 65 | 0.82 | | 43 | | | 5 | 31 | 21 | 100 | 335 | 95.9 |
| Example 66 | 0.82 | | 61 | | | 18 | 21 | | 100 | 342 | 97.1 |
| Example 67 | 0.82 | | 24 | | 20 | 45 | 11 | | 100 | 372 | 95.7 |

TABLE 6-continued

| | | | | | | | | | | |
|---|---|---|---|---|---|---|---|---|---|---|
| Example 68 | 0.82 | | | 3 | 38 | 29 | 30 | 100 | 375 | 95.1 |
| Example 69 | 0.82 | 33 | | 24 | 31 | 6 | 6 | 100 | 356 | 97.3 |
| Example 70 | 0.82 | 32 | | | 44 | 21 | 3 | 100 | 346 | 95.1 |
| Example 71 | 0.82 | 30 | | | 40 | 26 | 4 | 100 | 344 | 95.2 |
| Example 72 | 0.82 | 28 | | | 46 | 20 | 6 | 100 | 340 | 96.1 |
| Example 73 | 0.82 | 63 | | 6 | 24 | 7 | | 100 | 364 | 97.3 |
| Example 74 | 0.82 | 55 | | 4 | 31 | 10 | | 100 | 366 | 97.1 |
| Example 75 | 0.82 | 44 | | 17 | 30 | 9 | | 100 | 366 | 96.4 |
| Example 76 | 0.82 | 24 | | 21 | 42 | 13 | | 100 | 361 | 95.4 |
| Example 77 | 0.82 | | | 20 | 28 | 30 | 22 | 100 | 350 | 95 |
| Example 78 | 0.79 | 28 | | 55 | 12 | 5 | | 100 | 366 | 97.4 |
| Example 79 | 0.81 | 28 | | 55 | 12 | 5 | | 100 | 366 | 97.4 |
| Example 80 | 0.81 | 33 | | 44 | 12 | 7 | 4 | 100 | 364 | 97.1 |
| Example 81 | 0.24 | 100 | | | | | | 100 | 330 | 97 |

As shown in Table 6, when the hydrogen storage alloys containing the crystal phase having the $Ce_5Co_{19}$ type crystal structure and having a composition defined as $La_hR6_iR7_jMg_kR8_m$ (wherein R6 is one or more kind elements selected from a group consisting of rare earth metals including Y and excluding La; R7 is one or more kind elements selected from a group consisting of Zr, Ti, Zn, Sn and V; R8 is one or more kind elements selected from a group consisting of Ni, Co, Mn, Al, Cu, Fe, Cr, and Si; and h, i, j, k and m satisfy $0 \leq j \leq 0.65$; $2 \leq k \leq 5.5$; $0.70 \leq h/(h+i) \leq 0.85$; and $h+i+j+k+m=100$), that is, the hydrogen storage alloy of Examples 44 to 46, Examples 54 to 60, Examples 62 to 64, and Examples 66 to 80, were used, it was confirmed that excellent discharge capacity and cycle performance were exhibited.

Examples 82 to 91

Using the alloy raw materials of the compositions shown in the following Table 7, hydrogen storage alloys of Examples 82 to 91 were produced in the same manner as Example 1. When the lattice images of these hydrogen storage alloys were observed by a transmission electron microscope (TEM), it was confirmed that crystal phases with different crystal structures were layered in the c-axis direction.

Further, with respect to the hydrogen storage alloys, the production ratios of the crystal phases were calculated and cycle performance measurement was carried out as same as Example 1. The results are shown together in Table 7.

Figure 8:
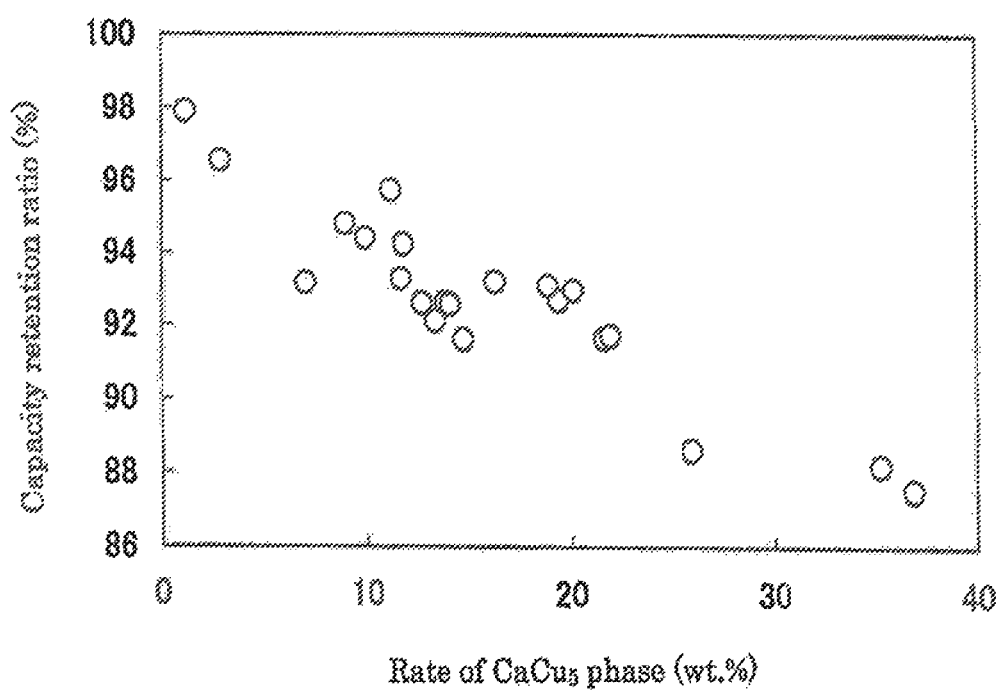
FIG. 8: A graph showing the relation of the capacity retention ratio to $CaCu_5$ phase production ratio, with respect to hydrogen storage alloys of Examples 82 to 91.

Further, with respect to the hydrogen storage alloys, based on the results of Table 7, a graph showing the relation of the capacity retention ratio to the production ratio of $CaCu_5$ phase is shown in FIG. 8.

As shown in FIG. 8, in the case of using the hydrogen storage alloys with 22% by weight or less of $CaCu_5$ phase, that is, the hydrogen storage alloys of Examples 85 to 91, it was confirmed that the capacity retention ratios were further higher values and particularly, in the case the $CaCu_5$ phase was 5% by weight or less, it was confirmed that the capacity retention ratios became extremely high values.

Examples 92 to 101

Using the alloy raw materials of the compositions shown in the following Table 8, hydrogen storage alloys of Examples 92 to 101 were produced in the same manner as Example 1. When the lattice images of these hydrogen storage alloys were observed by a transmission electron microscope (TEM), it was confirmed that crystal phases with different crystal structures were layered in the c-axis direction.

Further, with respect to the hydrogen storage alloys, the production ratios of the crystal phases were calculated in the same manner as Example 1. Furthermore, with respect to the hydrogen storage alloys, using Siebert PCT measurement apparatus (manufactured by Suzuki Syokan Co. Ltd., P73-07), the equilibrium pressure at 80° C. in case of H/M=0.5 of PCT curve (pressure-composition isothermal curve) was calculated. Further, after cells using the respective hydrogen storage alloys were left at 45° C. for 14 days, the remaining discharge capacity was measured in the same manner as

TABLE 7

| | Composition | | | | | | | | | Capacity retention ratio (%) | Produced phases | | | | | | |
|---|---|---|---|---|---|---|---|---|---|---|---|---|---|---|---|---|---|
| | La | Pr | Nd | Y | Mg | Ni | Co | Mn | Al | | CaCu5 | Ce2Ni7 | Gd2Co7 | Ce5Co19 | Pr5Co19 | La5MgNi24 | AuBe5 |
| Example 82 | 17.0 | 0.0 | 0.0 | 0.0 | 4.3 | 68.1 | 6.4 | 0.0 | 4.3 | 87.5 | 36.9 | 0.0 | 0.0 | 37.7 | 14.9 | 0.0 | 10.5 |
| Example 83 | 17.9 | 0.0 | 0.0 | 0.0 | 3.4 | 68.1 | 6.4 | 2.1 | 2.1 | 88.6 | 25.9 | 40.3 | 0.0 | 24.9 | 5.9 | 0.0 | 3.0 |
| Example 84 | 17.0 | 0.0 | 0.0 | 0.0 | 4.3 | 67.0 | 6.4 | 2.1 | 3.2 | 88.2 | 35.2 | 12.8 | 0.0 | 36.2 | 9.7 | 0.0 | 6.0 |
| Example 85 | 14.9 | 0.0 | 0.0 | 2.1 | 4.3 | 68.1 | 6.4 | 2.1 | 2.1 | 97.9 | 1.2 | 8.7 | 0.0 | 23.7 | 53.1 | 13.4 | 0.0 |
| Example 86 | 12.8 | 0.0 | 5.1 | 0.0 | 3.4 | 67.0 | 8.5 | 0.0 | 3.2 | 96.0 | 2.9 | 13.1 | 0.0 | 17.0 | 67.0 | 0.0 | 0.0 |
| Example 87 | 12.6 | 4.2 | 0.0 | 0.0 | 4.2 | 69.5 | 6.3 | 0.6 | 2.5 | 96.0 | 9.8 | 0.0 | 0.0 | 22.2 | 6.9 | 61.1 | 0.0 |
| Example 88 | 12.8 | 4.3 | 0.0 | 0.0 | 4.3 | 68.1 | 6.4 | 0.0 | 4.3 | 94.2 | 11.8 | 0.0 | 0.0 | 69.1 | 9.0 | 7.1 | 3.0 |
| Example 89 | 12.8 | 4.3 | 0.0 | 0.0 | 4.3 | 61.7 | 12.8 | 0.0 | 4.3 | 92.5 | 14.1 | 0.0 | 0.0 | 60.1 | 10.1 | 10.0 | 5.7 |
| Example 90 | 12.4 | 4.1 | 0.0 | 0.0 | 4.1 | 69.1 | 6.2 | 2.1 | 2.1 | 91.6 | 21.7 | 42.9 | 0.0 | 19.7 | 15.7 | 0.0 | 0.0 |
| Example 91 | 9.4 | 7.3 | 0.0 | 0.0 | 4.2 | 68.8 | 6.3 | 2.1 | 2.1 | 91.7 | 22.0 | 39.8 | 13.4 | 24.9 | 0.0 | 0.0 | 0.0 | described above and the remaining discharge capacity to the maximum discharge capacity was calculated. The results are also shown in Table 8.

35 μm) and dried and thereafter the resulting steel plate was pressed to a prescribed thickness (0.3 mm) to obtain a negative electrode.

TABLE 8

|  | Equilibrium pressure (Mpa) | Remaining capacity (%) | Composition |  |  |  |  |  |  |  |  |  |
|---|---|---|---|---|---|---|---|---|---|---|---|---|---|
|  |  |  | La | Pr | Nd | Y | Mg | Ni | Co | Mn | Al | B/A |
| Example 92 | 0.035 |  | 17.0 | 0.0 | 0.0 | 0.0 | 4.3 | 68.1 | 6.4 | 1.7 | 2.6 | 3.7 |
| Example 93 | 0.045 | 73.51 | 17.0 | 0.0 | 0.0 | 0.0 | 4.3 | 70.2 | 6.4 | 1.1 | 1.1 | 3.7 |
| Example 94 | 0.052 | 75.17 | 17.0 | 0.0 | 0.0 | 0.0 | 4.3 | 72.3 | 4.3 | 2.1 | 0.0 | 3.7 |
| Example 95 | 0.064 | 74.32 | 12.8 | 4.3 | 0.0 | 0.0 | 4.3 | 71.3 | 4.3 | 3.2 | 0.0 | 3.7 |
| Example 96 | 0.057 | 76.21 | 16.7 | 0.0 | 0.0 | 0.0 | 4.2 | 68.8 | 6.3 | 1.7 | 2.5 | 3.8 |
| Example 97 | 0.047 | 74.98 | 12.8 | 4.3 | 0.0 | 0.0 | 4.3 | 68.1 | 6.4 | 1.7 | 2.6 | 3.7 |
| Example 98 | 0.11 | 70.72 | 5.0 | 13.8 | 0.0 | 0.0 | 2.1 | 77.1 | 0.0 | 0.4 | 1.7 | 3.8 |
| Example 99 | 0.13 | 69.11 | 12.9 | 0.0 | 0.0 | 4.3 | 4.3 | 77.4 | 0.0 | 0.0 | 1.1 | 3.65 |
| Example 100 | 0.18 | 68.45 | 4.3 | 0.0 | 13.2 | 0.0 | 3.8 | 68.1 | 6.4 | 1.1 | 3.2 | 3.7 |
| Example 101 | 0.068 | 71.33 | 8.4 | 8.4 | 0.0 | 0.0 | 4.2 | 69.5 | 4.2 | 5.3 | 0.0 | 3.75 |

|  | Produced phases |  |  |  |  |  |  |  |
|---|---|---|---|---|---|---|---|---|
|  | Ce2Ni7 | Gd2Co7 | Ce5Co19 | Pr5Co19 | CaCu5 | AuBe5 | La5MgNi24 | Total |
| Example 92 | 14.59 | 0 | 14.47 | 9.84 | 8.03 | 0 | 53.06 | 100.0 |
| Example 93 | 39.03 | 0 | 40.22 | 8.37 | 12.38 | 0 | 0 | 100.0 |
| Example 94 | 36.3 | 0 | 32.6 | 18.4 | 12.7 | 0 | 0 | 100.0 |
| Example 95 | 44.47 | 4.04 | 28.92 | 16.29 | 6.27 | 0 | 0 | 100.0 |
| Example 96 | 14.39 | 0 | 18.53 | 8.62 | 16.34 | 0 | 42.12 | 100.0 |
| Example 97 | 17.88 | 0 | 24.38 | 48.42 | 6 | 0 | 3.33 | 100.0 |
| Example 98 | 30.22 | 0 | 39.67 | 13.89 | 16.23 | 0 | 0 | 100.0 |
| Example 99 | 13.05 | 33.51 | 43.44 | 0. | 10.02 | 0 | 0 | 100.0 |
| Example 100 | 36.1 | 0 | 33.45 | 8.81 | 18.9 | 2.77 | 0 | 100.0 |
| Example 101 | 20.54 | 0 | 30.23 | 29.64 | 19.6 | 0 | 0 | 100.0 |

Figure 9:
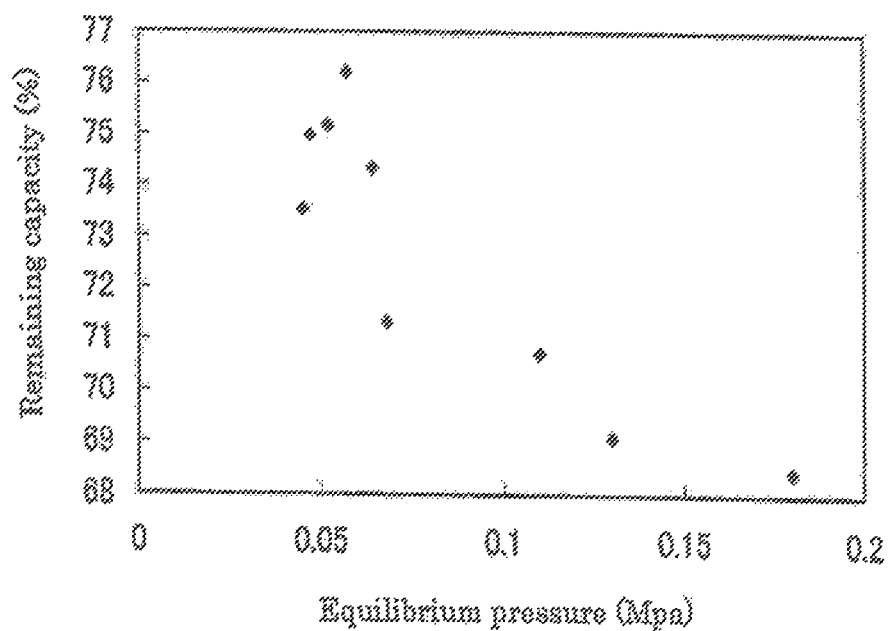
FIG. 9: A graph showing the relation of the remaining discharge capacity to hydrogen equilibrium pressure, with respect to hydrogen storage alloys of Examples 92 to 101.

Further, with respect to the respective hydrogen storage alloys, based on the results in Table 8, a graph showing the relation of the remaining discharge capacity to the hydrogen equilibrium pressure is shown in FIG. 9.

As shown in FIG. 9, in the case of using the hydrogen storage alloys with 22% by weight or less of $CaCu_5$ phase and having hydrogen equilibrium pressure of 0.07 MPa or lower, that is, the hydrogen storage alloys of Examples 92 to 97, it was confirmed that the remaining discharge capacity was high value.

Examples 102 to 109

Using the alloy raw materials of the compositions shown, in the following Table 9, hydrogen storage alloys of Examples 102 to 109 were produced in the same manner as Example 1. Herein, in Example 102 and Example 108, respectively high purity materials were used for sources of La, Ce, and Nd and in Examples 103 to 107 and Example 109 excluding the former, misch metal including La, Ce, Pr, and Nd was used. When the lattice images of these hydrogen storage alloys were observed by a transmission electron microscope (TEM), it was confirmed that crystal phases with different crystal structures were layered in the c-axis direction.

Next, using these hydrogen storage alloys for negative electrodes, sealed cells were respectively produced and the cycle life was measured for each sealed cell. The practical procedure was as described below.

<Production of Negative Electrode>
An aqueous solution in which a thickener (methyl cellulose) was dissolved and each hydrogen storage alloy powder were mixed and further mixed with 0.8% by weight of a binder (styrene-butadiene rubber) to obtain a paste which was applied to both faces of a punched steel plate (thickness <Production of Positive Electrode>
An aqueous solution in which a thickener (carboxymethyl cellulose) was dissolved and paste of an active material were packed in a foamed nickel substrate and dried and thereafter, the resulting substrate was pressed to a prescribed thickness (0.78 mm) to obtain a positive electrode. A material used as the active material was a material obtained by coating the surface of nickel hydroxide containing 3% by weight of zinc and 0.5% by weight of cobalt in form of a solid solution with 6% by weight of cobalt hydroxide.

<Production of Sealed Cell>
A jelly roll was produced by spirally rolling the obtained positive electrode and negative electrode at a ratio of positive electrode capacity 1 to negative electrode capacity 1.25 while inserting a separator between them and a positive electrode terminal part and a current collection terminal were resistance welded and thereafter, the jelly roll was housed in a cylindrical metal case. Further, 1.81 ml of an electrolyte solution containing 8 mol/L KOH and 0.8 mol/L LiOH was injected and a cover made of a metal and equipped with a safety valve was used for closing to produce each sealed cell with 2500 mAh AA size.

<Cycle Test>
After the above-mentioned sealed cell was initially charged at 20° C. and 0.02 It (A) (50 mA) for 10 hours, the cell was again charged at 0.25 It (A) (625 mA) for 5 hours. Thereafter, discharging at 20° C. and 0.2 It (A) (500 mA) to cut off voltage of 1 V and charging at 20° C. and 0.2 It (A) (500 mA) for 6 hours were repeated 10 times and finally discharging was carried out for chemical conversion treatment.

Thereafter, charging in condition of 0.5 It (A) and •dV=5 mV, 30 minute pause, and discharging (20° C.) at 1 It (A) to final voltage of IV were repeated and the number of cycles when the discharge capacity became 50% of the initial capacity was defined as the cycle life.

Figure 10:
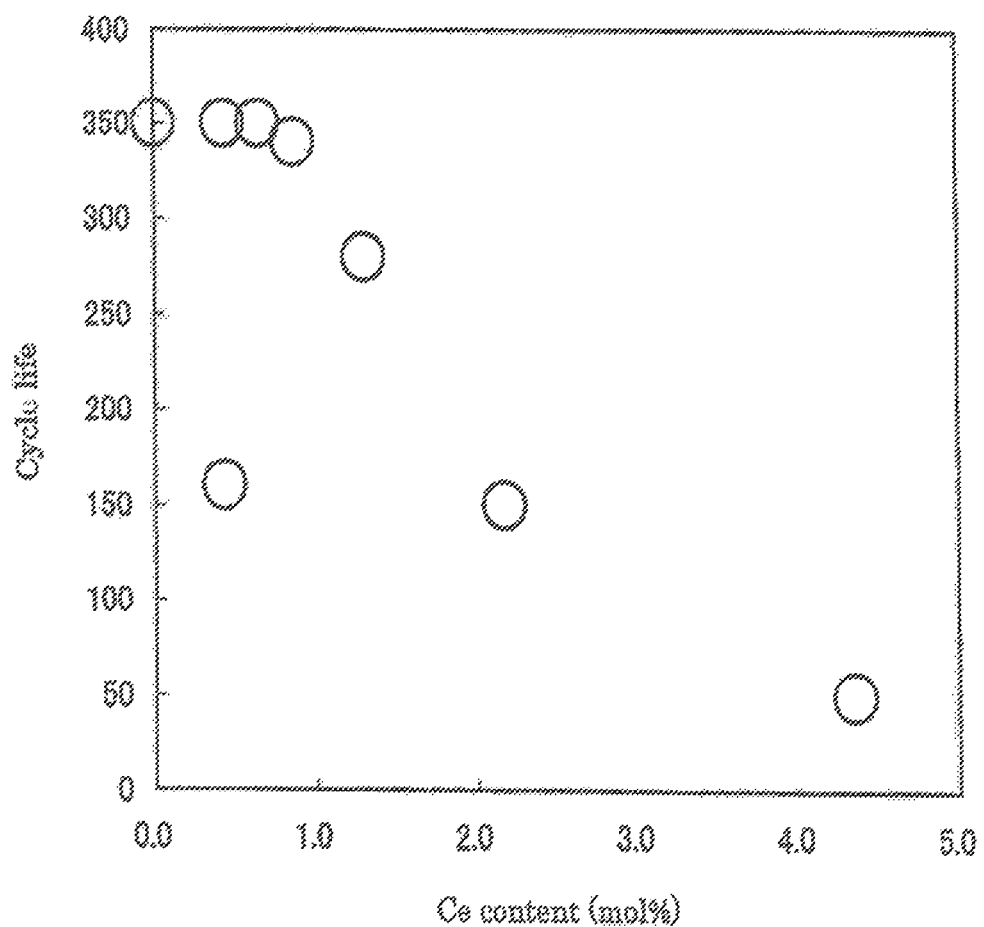
FIG. 10: A graph formed by plotting the Ce content and the cycle life, with respect to hydrogen storage alloys of Examples 102 to 109.

The measurement results are shown in Table 9 and FIG. 10.

TABLE 9

| | Alloy composition (mol %) | | | | | | | Total ratio of $Pr_5Co_{19}$ phase, $Ce_5Co_{19}$ phase, and $Ce_2Ni_7$ phase | |
|---|---|---|---|---|---|---|---|---|---|
| | La | Ce | Pr | Nd | Mg | Ni | Co | Al | (% by weight) | Cycle life |
| Example 102 | 14.1 | 0.0 | 0.0 | 4.3 | 3.3 | 72.8 | 2.2 | 3.3 | 98 | 350 |
| Example 103 | 15.2 | 0.4 | 0.9 | 2.0 | 3.3 | 72.8 | 2.2 | 3.3 | 98 | 350 |
| Example 104 | 14.8 | 0.7 | 0.9 | 2.2 | 3.3 | 72.8 | 2.2 | 3.3 | 98 | 350 |
| Example 105 | 14.6 | 0.9 | 0.7 | 2.2 | 3.5 | 72.8 | 2.2 | 3.3 | 96 | 340 |
| Example 106 | 14.8 | 1.3 | 0.4 | 2.0 | 3.3 | 72.8 | 2.2 | 3.3 | 95 | 280 |
| Example 107 | 13.9 | 2.2 | 0.2 | 2.0 | 3.5 | 72.8 | 2.2 | 3.3 | 85 | 150 |
| Example 108 | 13.9 | 4.3 | 0.0 | 0.0 | 3.5 | 72.8 | 2.2 | 3.3 | 76 | 50 |
| Example 109 | 16.3 | 0.4 | 0.2 | 1.3 | 3.5 | 72.8 | 2.2 | 3.3 | 88 | 160 |

As shown in Table 9, with respect to the hydrogen storage alloys of the invention, it was understood that even if misch metal was used as a raw material, the cycle life could be maintained for a relatively long time by controlling the Ce content to be 2.2 mol % or lower. Particularly, in the case of Example 103 to Example 106 in which the Ce content was 1.8 mol % or lower and the total ratio of $Pr_5Co_{19}$ phase, $Ce_5Co_{19}$ phase, and $Ce_2Ni_7$ phase was 95% by weight or higher were found having extremely excellent cycle life, similarly to the hydrogen storage alloy of Example 102 containing a high purity material, Nd, in a relatively high amount.

The invention claimed is:

1. A hydrogen storage alloy containing two or more crystal phases having different crystal structures, wherein the two or more crystal phases are layered in the c-axis direction of the crystal structures, and the hydrogen storage alloy has, as a main produced phase, a crystal phase having $Ce_5Co_{19}$ type crystal structure and a composition defined by a general formula $La_hR6_iR7_jMg_kR8_m$, wherein R6 is one or more elements selected from the group consisting of rare earth metals including Y and excluding La, wherein R7 is one or more elements selected from the group consisting of Zr, Ti, Zn, and V, wherein R8 is one or more elements selected from the group consisting of Ni, Co, Mn, Al, Cu, Fe, Cr, and Si, and wherein h, j, k and m satisfy $2.6 \leq i \leq 5.1$; $0.2 \leq j \leq 0.65$; $2 \leq k \leq 5.5$; $0.70 \leq h/(h+i) \leq 0.85$; and $h+i+j+k+m=100$.

2. A hydrogen storage alloy electrode using the hydrogen storage alloy according to claim 1 as a hydrogen storage medium.

3. A secondary battery using the hydrogen storage alloy electrode according to claim 2 as a negative electrode.

4. A method for producing the hydrogen storage alloy according to claim 1, comprising
 a melting step of heat melting alloy raw materials at prescribed mixing ratio in inert gas atmosphere;
 a cooling step of rapid solidification the melted alloy at a cooling speed of 1000° C./s or higher; and
 an annealing step of further annealing the alloy subjected to the cooling step at 860° C. or higher and 1000° C. or lower in inert gas atmosphere in pressurized state, resulting in the hydrogen storage alloy of claim 1.

* * * * *